US012488712B2

(12) United States Patent
Kim et al.

(10) Patent No.: US 12,488,712 B2
(45) Date of Patent: Dec. 2, 2025

(54) DISPLAY DEVICE

(71) Applicant: LG ELECTRONICS INC., Seoul (KR)

(72) Inventors: Jeongshik Kim, Seoul (KR); Sungchul Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 398 days.

(21) Appl. No.: 18/014,589

(22) PCT Filed: Apr. 29, 2021

(86) PCT No.: PCT/KR2021/005447
§ 371 (c)(1),
(2) Date: Jan. 5, 2023

(87) PCT Pub. No.: WO2022/010077
PCT Pub. Date: Jan. 13, 2022

(65) Prior Publication Data

US 2023/0252917 A1 Aug. 10, 2023

(30) Foreign Application Priority Data

Jul. 6, 2020 (KR) ........................ 10-2020-0082536
Sep. 14, 2020 (KR) ........................ 10-2020-0117988
(Continued)

(51) Int. Cl.
*G09F 19/02* (2006.01)
*F16C 11/04* (2006.01)
*G09F 9/33* (2006.01)

(52) U.S. Cl.
CPC .............. *G09F 19/02* (2013.01); *F16C 11/04* (2013.01); *G09F 9/335* (2021.05)

(58) Field of Classification Search
CPC .......... G09F 1/06; G09F 1/08; G09F 15/0062; G09F 1/065; G09F 7/205; G09F 15/0087;
(Continued)

(56) References Cited

U.S. PATENT DOCUMENTS 4,125,130 A * 11/1978 Yamamoto .............. F16L 11/00
138/121
4,979,242 A * 12/1990 Maggio ................. E04H 1/1244
135/901
(Continued)

FOREIGN PATENT DOCUMENTS

JP 5-265029 A 10/1993
KR 10-2012-0100881 A 9/2012
(Continued)

*Primary Examiner* — Cassandra Davis
(74) *Attorney, Agent, or Firm* — Birch, Stewart, Kolasch & Birch, LLP

(57) ABSTRACT

The present disclosure relates to a display device. A display device according to one embodiment of the present disclosure comprises: a housing; a plurality of display elements disposed in the housing in a first mode and configured to project out of the housing in a second mode; and a driving device configured to fold the plurality of display elements in a first axial direction in the first mode, and unfold at least a portion of the plurality of display elements in the second mode to form a polyhedral display. Accordingly, it is possible to implement a display device that is folded or unfolded by using the plurality of elements.

19 Claims, 37 Drawing Sheets

(30) Foreign Application Priority Data

Nov. 12, 2020 (KR) ........................ 10-2020-0150767
Nov. 12, 2020 (KR) ........................ 10-2020-0150768

(58) Field of Classification Search
CPC ....... G09F 7/20; B42D 15/008; B42D 15/042; B65D 5/0005; B65D 5/36; A63H 33/003; A63H 33/16; A63H 33/42
USPC .......... 52/649.5, 645, 79.5; 229/101, 117.01; 446/478, 487; 40/601, 610, 539
See application file for complete search history.

(56) References Cited

U.S. PATENT DOCUMENTS 5,762,262 A * 6/1998 Martin .................. B65D 81/32 229/120.21
5,791,077 A * 8/1998 Felber ..................... G09F 21/04 40/610
2003/0098303 A1 * 5/2003 Wang ..................... B65D 37/00 220/9.2
2011/0067279 A1 * 3/2011 Dos Santos Camacho ................ G09F 21/042 40/601
2019/0334104 A1 10/2019 Okazaki
2024/0084788 A1 * 3/2024 Song ..................... F03G 7/0612

FOREIGN PATENT DOCUMENTS

KR 10-1213494 B1 12/2012
KR 10-2014-0072999 A 6/2014
WO WO-2019224589 A1 * 11/2019

* cited by examiner

DISPLAY DEVICE

CROSS REFERENCE TO RELATED APPLICATIONS

This application is the National Phase of PCT/KR2021/005447 filed on Apr. , 2021, which claims priority under 35 U.S.C. § 119 (a) to Patent Application No. 10-2020-0082536 filed in the Republic of Korea on Jul. 6, 2020; Patent Application No. 10-2020-0117988 filed in the Republic of Korea on Sep. 14, 2020; Patent Application No. 10-2020-0150767 filed in the Republic of Korea on Nov. 12, 2020; and Patent Application No. 10-2020-0150768 filed in the Republic of Korea on Nov. 12, 2020, and the entire contents of all of the above-identified applications are hereby expressly incorporated by reference into the present application.

BACKGROUND OF THE DISCLOSURE

1. Field of the Disclosure

The present disclosure relates to a display device, and more particularly, to a display device that can be folded or unfolded by using a plurality of display elements.

2. Description of the Related Art

A display device is a device that can display an image through a display.

Examples of the display device may include LCD- and OLED-based flat panel displays.

Recently, display devices are increasingly used in outdoor public areas, and therefore various types of commercial display devices for commercial use are under development.

SUMMARY

An aspect of the present disclosure is to provide a display device that can be folded or unfolded by using a plurality of display elements.

Another aspect of the present disclosure is to provide a cuboid-shaped display device by using a plurality of display elements.

Yet another aspect of the present disclosure is to provide a cuboid-shaped display device that can be varied in height by using a plurality of display elements.

To accomplish the above aspects, a display device according to an embodiment of the present disclosure may include: a housing; a plurality of display elements disposed in the housing in a first mode and configured to project out of the housing in a second mode; and a driving device configured to fold the plurality of display elements in a first axial direction in the first mode, and unfold at least a portion of the plurality of display elements in the second mode to form a polyhedral display.

In the second mode, in response to the plurality of display elements rising to a first height, a first number of display elements, among the plurality of display elements, may be unfolded to form a first polyhedral display, and, in the second mode, in response to the plurality of display elements rising to a second height which is greater than the first height, a second number of display elements, among the plurality of display elements, may be unfolded to form a second polyhedral display.

The driving device may include: a lift disposed in the housing, and configured to lift in the first axial direction; a motor disposed in the housing, and configured to rotate a plate connected to a portion of the plurality of display elements; and an elevating apparatus configured to elevate the plate in the first axial direction.

The driving device may include: a motor disposed in the housing, and configured to rotate a plate connected to a portion of the plurality of display elements; and wires connected to another portion of the plurality of display elements to be elevated in the first axial direction.

The driving device may include: at least one tube disposed between the plurality of display elements; and a compressor disposed in the housing, and configured to supply air to the tube.

The display device may further include: a side cover connected to a portion of the plurality of display elements; a lift disposed in the housing, and configured to lift the side cover in the first axial direction; a first plate disposed in the housing and connected to another portion of the plurality of display elements; a motor disposed in the housing, and configured to rotate the first plate; a second plate disposed in the housing and placed under the motor; and an elevating apparatus disposed under the second plate in the housing, and configured to elevate the second plate in the first axial direction.

In the second mode, in response to the lift and the elevating apparatus rising to a first height, a first number of display elements, among the plurality of display elements, may be unfolded by a first rotation of the motor, and may be configured to form a first polyhedral display, and, in the second mode, in response to the lift and the elevating apparatus rising to a second height which is greater than the first height, a second number of display elements, among the plurality of display elements, may be unfolded by a second rotation of the motor, and may be configured to form a second polyhedral display.

In the second mode, as a height of the lift and the elevating apparatus increases, the number of rotations of the motor increases.

The display device may further include an upper cover connected to a portion of the plurality of display elements, wherein the upper cover is connected to the side cover.

The first and second display elements adjacent to each other may be connected by at least one hinge, the first and second display elements may be folded against each other in the first mode, and the first and second display elements may intersect at a right angle or be unfolded with respect to the hinge.

At least one flexible connector may be disposed between the first and second display elements.

An electromagnet or a magnet may be disposed on rear faces of the display elements.

An electromagnet or a magnet may be disposed in a line on rear faces of the display elements.

A plurality of electromagnets or magnets may be disposed on rear faces of the display elements, spaced apart from each other.

The display elements may include triangular origami display elements.

First to third display elements, among the plurality of display elements, which overlap each other in the first mode, may be unfolded in a line in the second mode, a connecting member with elasticity may be disposed between the first display element and the second display element, and a hinge may be disposed between the second display element and the third display element.

A display surface may be formed on front faces of the second display element and the third display element, which are opposite sides of the rear faces contacting the hinge.

As the lift and the elevating apparatus rise in the first axial direction and the motor rotates, the plurality of display elements may rise, at least a portion of the plurality of display elements may be unfolded, and the upper cover may cover top faces of the plurality of display elements.

The plurality of display elements may rise as the lift and the elevating apparatus rise in the first axial direction, and the plurality of display elements may rotate as the motor rotates, at least a portion of the plurality of display elements may be unfolded, and the distance between the unfolded display elements may be fixed as an electrical signal is supplied to an electromagnet between the plurality of display elements.

To accomplish the above aspects, a display device according to another embodiment of the present disclosure may include: a housing; a plurality of display elements disposed in the housing in a first mode and configured to project out of the housing in a second mode; a side cover connected to a portion of the plurality of display elements; a lift disposed in the housing, and configured to lift the side cover in a first axial direction; a first plate disposed in the housing and connected to another portion of the plurality of display elements; a motor disposed in the housing, and configured to rotate the first plate; a second plate disposed in the housing and placed under the motor; and an elevating apparatus disposed under the second plate in the housing, and configured to elevate the second plate in the first axial direction, wherein the plurality of display elements is folded in the first axial direction in the first mode, at least a portion of the plurality of display elements is unfolded in the second mode, and a polyhedral display is formed.

In the second mode, in response to the lift and the elevating apparatus rising to a first height, a first number of display elements, among the plurality of display elements, may be unfolded by a first rotation of the motor, and may be configured to form a first polyhedral display, and, in the second mode, in response to the lift and the elevating apparatus rising to a second height which is greater than the first height, a second number of display elements, among the plurality of display elements, may be unfolded by a second rotation of the motor, and may be configured to form a second polyhedral display.

In the second mode, as a height of the lift and the elevating apparatus increases, the number of rotations of the motor may increase.

If the second height is twice the height of the first height, the second rotation may be twice as much as the first rotation.

The display device may further include an upper cover connected to a portion of the plurality of display elements.

In the second mode, at least a portion of the plurality of display elements may be unfolded and raised based on a rotation of the motor, and may be configured to form the polyhedral display.

The display device may further include: a hinge connected between the plurality of display elements; and an electromagnet disposed on rear faces of the display elements, wherein, in the second mode, the distance between the unfolded display elements is fixed based on a signal applied to the electromagnet.

In the second mode, the angle between first and second display elements adjacent to each other, among the plurality of display elements, may be kept at 180 degrees, the angle between third and fourth display elements adjacent to each other, among the plurality of display elements, may be kept at 90 degrees, and fifth and sixth display elements adjacent to each other, among the plurality of display elements, may differ in height.

Effect of the Disclosure

A display device according to an embodiment of the present disclosure may include: a housing; a plurality of display elements disposed in the housing in a first mode and configured to project out of the housing in a second mode; and a driving device configured to fold the plurality of display elements in a first axial direction in the first mode, and unfold at least a portion of the plurality of display elements in the second mode to form a polyhedral display. Accordingly, it is possible to implement a display device that can be folded or unfolded by using a plurality of elements. In particular, a cuboid-shaped display device can be implemented by using a plurality of display elements.

In the second mode, in response to the plurality of display elements rising to a first height, a first number of display elements, among the plurality of display elements, may be unfolded to form a first polyhedral display, and, in the second mode, in response to the plurality of display elements rising to a second height which is greater than the first height, a second number of display elements, among the plurality of display elements, may be unfolded to form a second polyhedral display. Accordingly, it is possible to implement a cuboid-shaped display device that can be varied in height by using a plurality of display elements.

The driving device may include: a lift disposed in the housing, and configured to lift in the first axial direction; a motor disposed in the housing, and configured to rotate a plate connected to a portion of the plurality of display elements; and an elevating apparatus configured to elevate the plate in the first axial direction. Accordingly, it is possible to implement a display device that can be folded or unfolded by using a plurality of elements.

The driving device may include: a motor disposed in the housing, and configured to rotate a plate connected to a portion of the plurality of display elements; and wires connected to another portion of the plurality of display elements to be elevated in the first axial direction. Accordingly, it is possible to implement a display device that can be folded or unfolded by using a plurality of elements.

The driving device may include: at least one tube disposed between the plurality of display elements; and a compressor disposed in the housing, and configured to supply air to the tube. Accordingly, it is possible to implement a display device that can be folded or unfolded by using a plurality of elements.

The display device may further include: a side cover connected to a portion of the plurality of display elements; a lift disposed in the housing, and configured to lift the side cover in the first axial direction; a first plate disposed in the housing and connected to another portion of the plurality of display elements; a motor disposed in the housing, and configured to rotate the first plate; a second plate disposed in the housing and placed under the motor; and an elevating apparatus disposed under the second plate in the housing, and configured to elevate the second plate in the first axial direction. Accordingly, it is possible to implement a display device that can be folded or unfolded by using a plurality of elements.

In the second mode, in response to the lift and the elevating apparatus rising to a first height, a first number of display elements, among the plurality of display elements, may be unfolded by a first rotation of the motor, and may be configured to form a first polyhedral display, and, in the second mode, in response to the lift and the elevating apparatus rising to a second height which is greater than the first height, a second number of display elements, among the plurality of display elements, may be unfolded by a second rotation of the motor, and may be configured to form a second polyhedral display. Accordingly, it is possible to implement a display device that can be folded or unfolded by using a plurality of elements.

In the second mode, as a height of the lift and the elevating apparatus increases, the number of rotations of the motor may increase. Accordingly, it is possible to implement a display device that can be folded or unfolded by using a plurality of elements.

The display device may further include an upper cover connected to a portion of the plurality of display elements, wherein the upper cover is connected to the side cover. Accordingly, it is possible to implement a display device that can be folded or unfolded by using a plurality of elements.

The first and second display elements adjacent to each other may be connected by at least one hinge, the first and second display elements may be folded against each other in the first mode, and the first and second display elements may intersect at a right angle or be unfolded with respect to the hinge. Accordingly, it is possible to implement a display device that can be folded or unfolded by using a plurality of elements.

At least one flexible connector may be disposed between the first and second display elements. Accordingly, it is possible to implement a display device that can be folded or unfolded by using a plurality of elements.

An electromagnet or a magnet may be disposed on rear faces of the display elements. Accordingly, it is possible to implement a display device that can be folded or unfolded by using a plurality of elements.

An electromagnet or a magnet may be disposed in a line on rear faces of the display elements. Accordingly, it is possible to implement a display device that can be folded or unfolded by using a plurality of elements.

A plurality of electromagnets or magnets may be disposed on rear faces of the display elements, spaced apart from each other. Accordingly, it is possible to implement a display device that can be folded or unfolded by using a plurality of elements.

The display elements may include triangular origami display elements. Accordingly, it is possible to implement a display device that can be folded or unfolded by using a plurality of elements.

First to third display elements, among the plurality of display elements, which overlap each other in the first mode, may be unfolded in a line in the second mode, a connecting member with elasticity may be disposed between the first display element and the second display element, and a hinge may be disposed between the second display element and the third display element. Accordingly, it is possible to implement a display device that can be folded or unfolded by using a plurality of elements.

A display surface may be formed on front faces of the second display element and the third display element, which are opposite sides of the rear faces contacting the hinge. Accordingly, it is possible to implement a display device that can be folded or unfolded by using a plurality of elements.

As the lift and the elevating apparatus rise in the first axial direction and the motor rotates, the plurality of display elements may rise, at least a portion of the plurality of display elements may be unfolded, and the upper cover may cover top faces of the plurality of display elements. Accordingly, it is possible to implement a display device that can be folded or unfolded by using a plurality of elements.

The plurality of display elements may rise as the lift and the elevating apparatus rise in the first axial direction, and the plurality of display elements may rotate as the motor rotates, at least a portion of the plurality of display elements may be unfolded, and the distance between the unfolded display elements may be fixed as an electrical signal is supplied to an electromagnet between the plurality of display elements. Accordingly, it is possible to implement a display device that can be folded or unfolded by using a plurality of elements.

To accomplish the above aspects, a display device according to another embodiment of the present disclosure may include: a housing; a plurality of display elements disposed in the housing in a first mode and configured to project out of the housing in a second mode; a side cover connected to a portion of the plurality of display elements; a lift disposed in the housing, and configured to lift the side cover in a first axial direction; a first plate disposed in the housing and connected to another portion of the plurality of display elements; a motor disposed in the housing, and configured to rotate the first plate; a second plate disposed in the housing and placed under the motor; and an elevating apparatus disposed under the second plate in the housing, and configured to elevate the second plate in the first axial direction, wherein the plurality of display elements is folded in the first axial direction in the first mode, at least a portion of the plurality of display elements is unfolded in the second mode, and a polyhedral display is formed. Accordingly, it is possible to implement a display device that can be folded or unfolded by using a plurality of elements. In particular, a cuboid-shaped display device can be implemented by using a plurality of display elements.

In the second mode, in response to the lift and the elevating apparatus rising to a first height, a first number of display elements, among the plurality of display elements, may be unfolded by a first rotation of the motor, and may be configured to form a first polyhedral display, and, in the second mode, in response to the lift and the elevating apparatus rising to a second height which is greater than the first height, a second number of display elements, among the plurality of display elements, may be unfolded by a second rotation of the motor, and may be configured to form a second polyhedral display. Accordingly, it is possible to implement a cuboid-shaped display device that can be varied in height by using a plurality of display elements.

In the second mode, as a height of the lift and the elevating apparatus increases, the number of rotations of the motor may be increase. Accordingly, it is possible to implement a display device that can be folded or unfolded by using a plurality of elements.

If the second height is twice the height of the first height, the second rotation may be twice as much as the first rotation. Accordingly, it is possible to implement a display device that can be folded or unfolded by using a plurality of elements.

The display device may further include an upper cover connected to a portion of the plurality of display elements. Accordingly, it is possible to implement a display device that can be folded or unfolded by using a plurality of elements.

In the second mode, at least a portion of the plurality of display elements may be unfolded and raised based on a rotation of the motor, and may be configured to form the polyhedral display. Accordingly, it is possible to implement a display device that can be folded or unfolded by using a plurality of elements.

The display device may further include: a hinge connected between the plurality of display elements; and an electromagnet disposed on rear faces of the display elements, wherein, in the second mode, the distance between the unfolded display elements is fixed based on a signal applied to the electromagnet. Accordingly, it is possible to implement a display device that can be folded or unfolded by using a plurality of elements.

In the second mode, the angle between first and second display elements adjacent to each other, among the plurality of display elements, may be kept at 180 degrees, the angle between third and fourth display elements adjacent to each other, among the plurality of display elements, may be kept at 90 degrees, and fifth and sixth display elements adjacent to each other, among the plurality of display elements, may differ in height. Accordingly, it is possible to implement a display device that can be folded or unfolded by using a plurality of elements.

DETAILED DESCRIPTION OF THE PREFERRED EMBODIMENTS

Figure 1A:
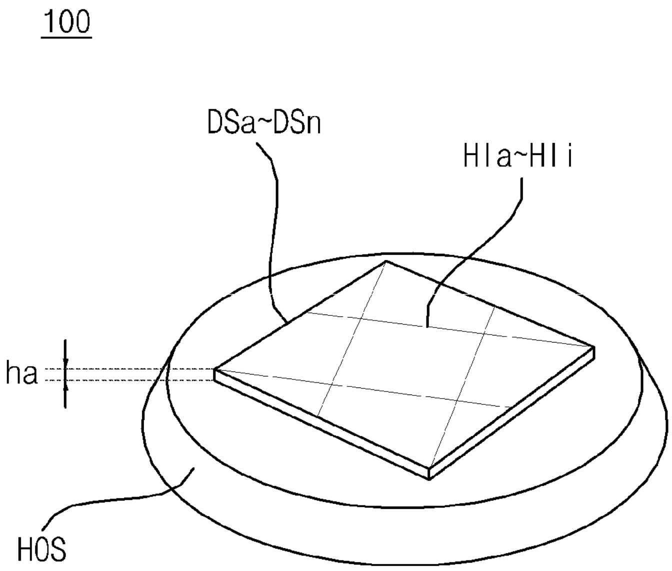
FIGS. 1A and 1B are views depicting a display device according to an embodiment of the present disclosure.

Hereinafter, the present disclosure will be described in detail with reference to the drawings. In the drawings, in order to clearly and briefly describe the present disclosure, the illustration of parts irrelevant to the description is omitted, and the same reference numerals are used for the same or extremely similar parts throughout the specification.

It will be understood that when the terms "includes," "comprises," "including," and/or "comprising," when used in this disclosure, specify the presence of stated features, figures, steps, operations, components, parts, or combinations thereof, but do not preclude the presence or addition of one or more other features, figures, steps, operations, components, parts, or combinations thereof.

It will be understood that, although the terms including ordinal numbers, such as "first", "second", etc., may be used herein to describe various elements, these elements are not limited by these terms. These terms are simply used to distinguish one element from another.

Figure 1B:
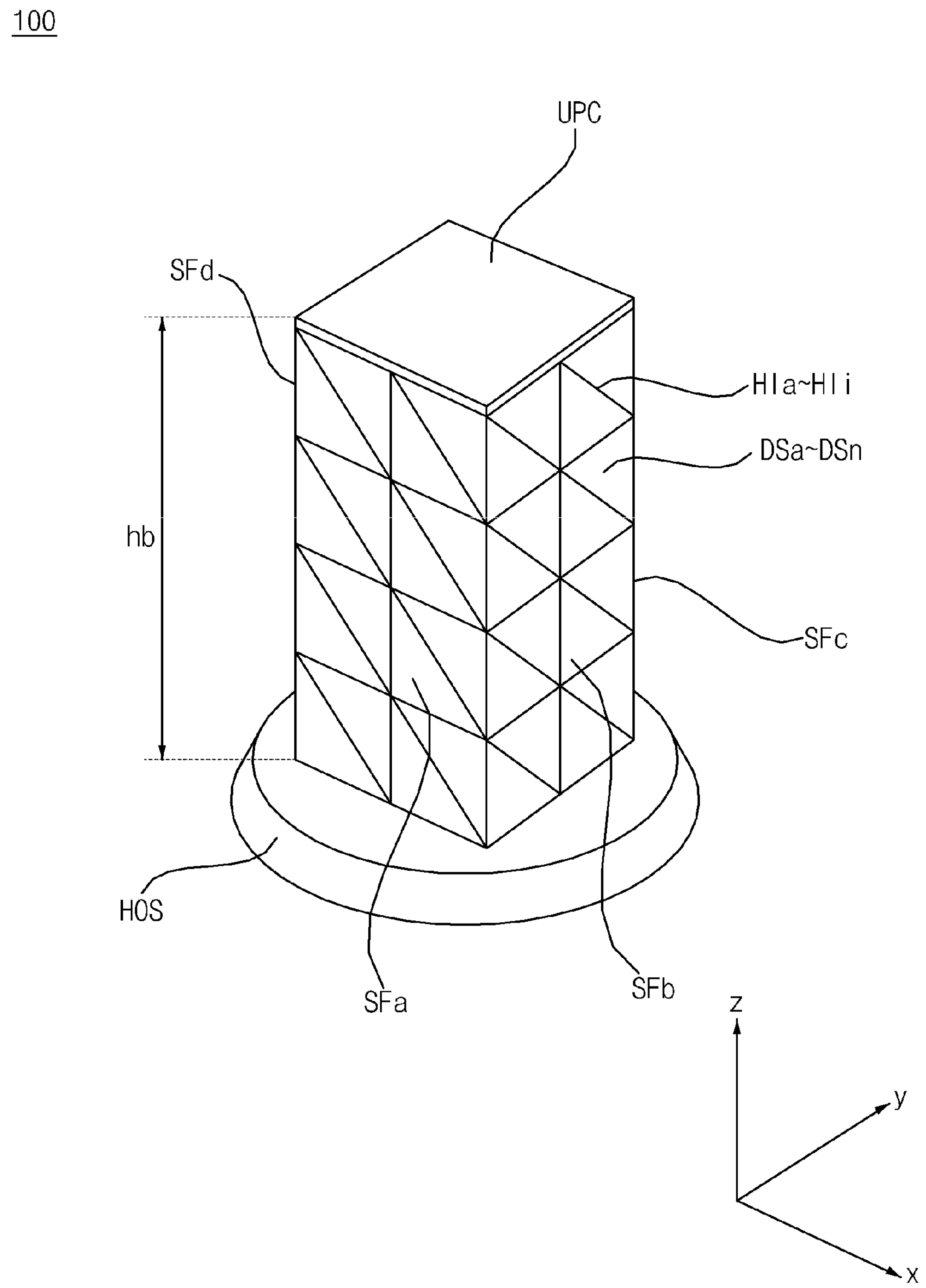

FIGS. 1A and 1B are views depicting a display device according to an embodiment of the present disclosure.

Referring to the drawings, FIG. 1A illustrates a first mode of the display device 100 in which a plurality of display elements DSa to DSn is disposed in a housing HOS.

That is, in the first mode, the plurality of display elements DSa to DSn may be folded in a first axial direction (e.g., z-axis direction). In the drawings, the height of the plurality of display elements DSa to DSn folded against one another is denoted by ha.

Meanwhile, a plurality of hinges HIa to HIi may be disposed between the plurality of display elements DSa to DSn.

FIG. 1B illustrates a second mode in which the plurality of display elements DSa to DSn project out of the housing HS to form a polyhedral display.

That is, in the second mode, at least a portion of the plurality of display elements DSa to DSn may be unfolded, and project in the first axial direction (e.g., z-axis direction). In the drawings, the height of the plurality of display elements unfolded is denoted by hb which is greater than ha.

The display device 100 according to an embodiment of the present disclosure may include a housing HOS, a plurality of display elements DSa to DSn disposed in the housing HOS in a first mode and configured to project out of the housing HOS in a second mode, and a driving device (184 in FIG. 3) for folding the plurality of display elements DSa to DSn in a first axial direction in the first mode, and unfolding at least a portion of the plurality of display elements DSa to DSn in the second mode to form a polyhedral display. Accordingly, it is possible to implement a display device 100 that can be folded or unfolded by using a plurality of display elements. In particular, a cuboid-shaped display device 100 can be implemented as shown in FIG. 1B, by using a plurality of display elements.

Meanwhile, the display elements may include triangular origami display elements. Accordingly, it is possible to implement a display device that can be folded or unfolded by using a plurality of display elements.

Meanwhile, FIG. 1B illustrates that a square display shape is formed by two triangular display elements, and that square display shapes are formed in four tiers in the z-axis direction.

Meanwhile, in the second mode, at least a portion of the plurality of display elements DSa to DSn may form a polyhedral display as they unfold and rise up, based on a rotation of a motor STM.

Meanwhile, in the second mode, when the plurality of display elements DSa to DSn rises to a first height, a first number of display elements, among the plurality of display elements DSa to DSn, may be unfolded to form a first polyhedral display. That is, it is possible to form a cuboid-shaped display by using two tiers of square display shapes from the bottom up, among the four tiers of square display shapes in FIG. 1B.

Meanwhile, in the second mode, when the plurality of display elements DSa to DSn rises to a second height which is greater than the first height, a second number of display elements, among the plurality of display elements DSa to DSn, may be unfolded to form a second polyhedral display. That is, as shown in FIG. 1B, a cuboid-shaped display with the height ha may be formed.

Accordingly, it is possible to implement a cuboid-shaped display device 100 that can be varied in height by using the plurality of display elements DSa to DSn.

Meanwhile, FIG. 1B illustrates that display surfaces SFa, SFb, SFc, and SFd are formed on four sides of the cuboid, but not on the top and bottom.

Meanwhile, the display elements illustrated in FIGS. 1A and 1B may include LEDs, mini LEDs, micro LEDs, or OLEDs.

Meanwhile, light is outputted by light emission to the front face of each display element DSa to DSn, and a supporter (SPT in FIG. 11F) for supporting a display element may be attached onto the rear face of the display element.

Meanwhile, the driving device 184 may unfold or spread out at least a portion of the plurality of display elements DSa to DSn in various ways.

For example, at least a portion of the plurality of display elements DSa to DSn may be unfolded or spread out by using a lift, a motor, etc.

The driving device 184 in the display device 100 in FIG. 1B may include a lift (LFT in FIG. 11A) disposed in the housing HOS, for lifting in the first axial direction, a motor (STM in FIG. 11A) disposed in the housing HOS, for rotating a plate (FLTa in FIG. 11A) connected to a portion of the plurality of display elements DSa to DSn, and an elevating apparatus (ELE in FIG. 11A) for elevating the plate in the first axial direction. Accordingly, it is possible to implement a display device that can be folded or unfolded by using a plurality of display elements. Therefore, the visibility of image display may be improved when an image is displayed using the display device 100.

Figure 2A:
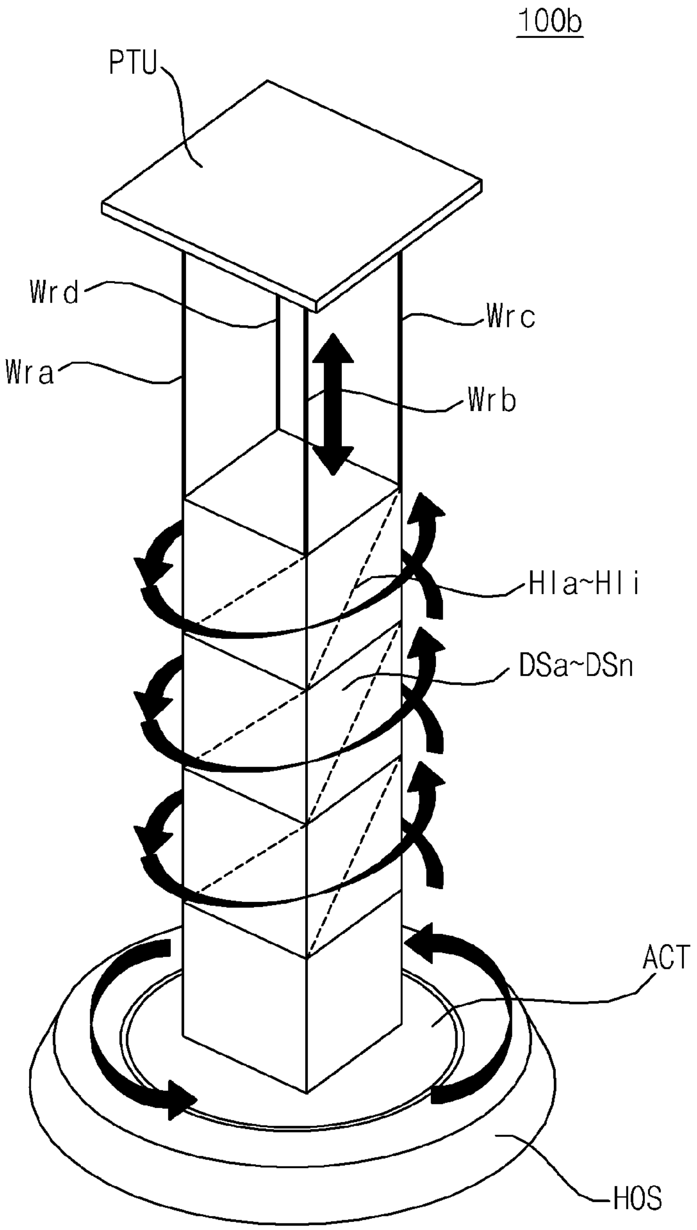
FIGS. 2A and 2B are views depicting a display device according to various embodiments of the present disclosure.

As another example, as shown in FIG. 2A, the driving device 184 may unfold or spread out at least a portion of the plurality of display elements DSa to DSn by wiring.

Figure 2B:
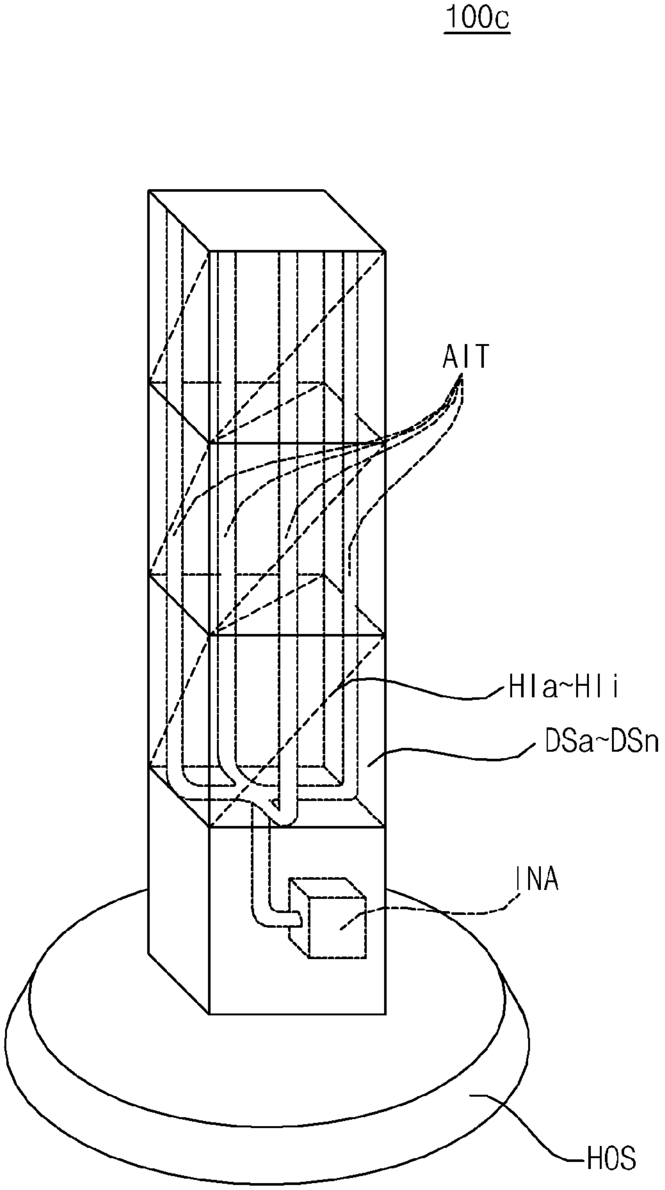

As yet another example, as shown in FIG. 2B, the driving device 184 may unfold or spread out at least a portion of the plurality of display elements DSa to DSn by air injection.

Meanwhile, according to the display device 100 of FIG. 1B, the height of a cuboidal column may be varied.

Such a display device 100 is a mobile device that can be easily folded and carried around anywhere.

Alternatively, the display device 100 may be a table-top type that can be placed as a small appliance on a table or space in a building, or may be a built-in type.

Meanwhile, such a display device 100 may operate as a large pole-type display device in a public place or outdoors.

If necessary, the large pole may be implemented as a structure in which it moves up from the bottom or a structure in which it moves down from the ceiling.

Meanwhile, although the figure depicts a cub-shaped structure, 3-dimensional variations such as a V-shape or heart shape, a diamond shape, etc. are possible.

FIGS. 2A and 2B are views depicting a display device according to various embodiments of the present disclosure.

First of all, FIG. 2A illustrates a display device 100*b* that unfolds or spreads out at least a portion of the plurality of display elements DSa to DSn by wiring.

Referring to the drawings, the driving device 184 of the display device 100*b* according to another embodiment of the present disclosure may include a motor disposed in the housing HOS, for rotating a plate (not shown) connected to a portion of the plurality of display elements DSa to DSN, and wires Wra to Wrd connected to another portion of the plurality of display elements DSa to DSn to be elevated in the first axial direction.

The wires Wra to Wrd may be wound upward by an operation of a separate motor (not shown) disposed on an upper plate PTU, and therefore a portion of the plurality of display elements DSa to DSn may be spread out in the z-axis direction.

Meanwhile, the wires Wra to Wrd may be wound downward by an operation of a separate motor (not shown) disposed on the upper plate PTU, and therefore a portion of the plurality of display elements DSa to DSn may be folded against one another in the z-axis direction.

Meanwhile, FIG. 2A illustrates that a square display shape is formed by two triangular display elements, and that square display shapes are formed in three tiers in the z-axis direction.

In this manner, it is possible to provide a display device 100*b* that can be folded or unfolded by using a plurality of display elements.

Meanwhile, according to the display device 100*b* of FIG. 2A, the wires Wra to Wrd connected to an outer side of the upper plate PTU may be pulled or loosened in a direction of gravitational force (z-axis direction), and therefore, the display device 100*b* can be formed or folded into 3-dimensional pole shape as it twists.

Meanwhile, the plurality of display elements Dsa to Dsn may be rotated clockwise or counterclockwise by using a rotational actuator ACT at the lower or upper end, and therefore can be formed or folded into a 3-dimensional pole shape.

Next, FIG. 2B illustrates a display device 100*c* that unfolds or spreads out at least a portion of the plurality of display elements DSa to DSn by air injection.

Referring to the drawing, the driving device 184 of the display device 100*c* according to yet another embodiment of the present disclosure may include at least one tube AIT disposed between the plurality of display elements DSa to DSn, and a compressor INA disposed in the housing HOS, for supplying air to the tube AIT.

Meanwhile, a portion of the plurality of display elements DSa to DSn may be unfolded or spread out by supplying air to the tube AIT.

Meanwhile, when collecting air through the compressor INA, the plurality of display elements DSa to DSn may be folded against one another in the z-axis direction.

In this manner, it is possible to implement a display device 100*c* that can be folded or unfolded by using a plurality of display elements.

Meanwhile, according to the display device 100*c*, if the driving device is not present on the outside, the driving device is disposed in the housing.

In particular, twisted variations may be made by using a pneumatic tube AIT that connects the display elements DSa to DSn.

Specifically, when air is let into the pneumatic tube AIT by an operation of the compressor INA, an origami surface is unfolded, and, when a pneumatic pressure is let out, the origami surface is folded to an inner side.

Figure 3:
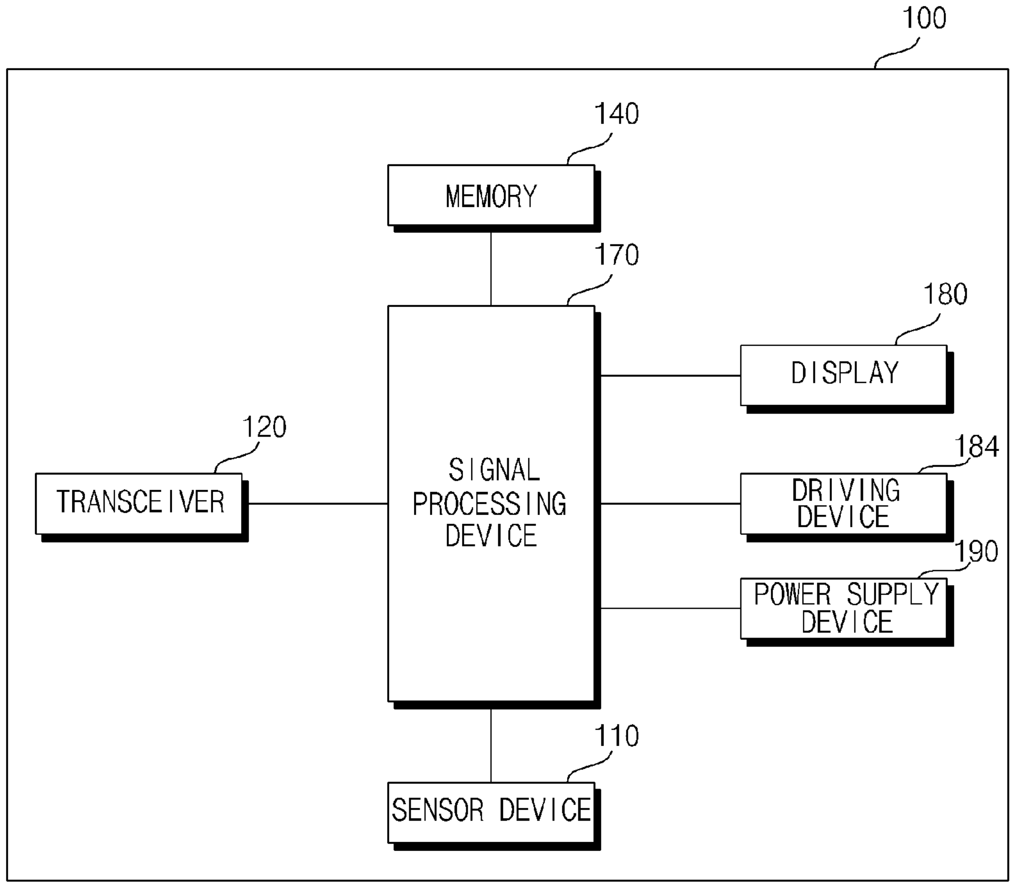
FIG. 3 shows an example of an inner block diagram of the display device of FIG. 1B.

FIG. 3 shows an example of an inner block diagram of the display device of FIG. 1B.

Referring to the drawing, the display device 100 according to an embodiment of the present disclosure may include a sensor device 110, a transceiver 120, a memory 140, a signal processing device 170, a display 180, a driving device 184, and a power supply device 190.

The sensor device 110 may have a current sensor (not shown) which detects a current applied to an electromagnet (not shown) when display elements in the display 180 are folded or unfolded.

Information sensed by the current sensor (not shown) may be applied to the signal processing device 170.

Meanwhile, the sensor device 110 may include an illumination sensor for sensing illumination around the display device 100. A sensed value of illumination may be transmitted to the signal processing device 170.

The transceiver 120 may send or receive data to or from an external device (not shown) or the like. To this end, the transceiver 120 may perform wired communication or wireless communication.

For example, various kinds of information and images may be received by performing wireless communication with a mobile terminal (not shown).

Meanwhile, the transceiver 120 may provide an interface for connecting to a wired/wireless network including an internet network.

For example, the transceiver 120 may receive content or data provided by an internet or content provider or a network administrator over a network.

The memory 140 may store a program for processing and controlling signals in the signal processing device 170, and may store signal-processed video, audio, or data signals.

Moreover, the memory 140 may perform a function for temporarily storing video, audio, or data signals inputted into the transceiver 120.

The signal processing device 170 may generate and output signals for video or audio output by demultiplexing a stream inputted from the transceiver 120 or the memory 140 or processing demultiplexed signals.

A video signal video-processed by the signal processing device 170 may be inputted into the display 180 and displayed as an image corresponding this video signal. Also, a video signal video-processed by the signal processing device 170 may be outputted to an external output device through the transceiver 120.

An audio signal processed by the signal processing device may be outputted to an audio output device (not shown). Also, an audio signal processed by the signal processing device 170 may be outputted to an external output device through the transceiver 120.

Meanwhile, the signal processing device 170 may perform various kinds of signal processing, and, to this end, may be implemented in the form of a system on chip (SOC).

Besides, the signal processing device 170 may control overall operation in the display device 100.

Meanwhile, the signal processing device 170 may control in such a way as to vary the level of a scan signal applied to a scan switching element for driving a plurality of light-emitting diodes or the level of a data signal applied to a data switching element for driving a plurality of light-emitting diodes, based on a value of illumination sensed by the sensor device 110.

In particular, the signal processing device 170 may control in such a way that, the higher the surrounding illumination, the lower the level of a scan signal applied the scan switching element or the level of a data signal applied to the data switching element.

The display 180 may have a plurality of display elements DSa to DSn and a plurality of hinges HIa to HIi disposed between the plurality of display elements DSa to DSn.

In the first mode, the plurality of display elements DSa to DSn may be folded in the first axial direction (e.g., z-axis direction), and, in the second mode, at least a portion of the plurality of display elements DSa to DSn may be unfolded and project in the first axial direction (e.g., z-axis direction). Therefore, it is possible to implement a display device 100 that can be folded or unfolded by using a plurality of display elements.

The driving device 184 may unfold or spread out at least a portion of the plurality of display elements DSa to DSn in various ways.

For example, the driving device 184 may unfold or spread out at least a portion of the plurality of display elements DSa to DSn by using a lift, a motor, etc.

As another example, the driving device 184 may unfold or spread out at least a portion of the plurality of display elements DSa to DSn by wiring.

As yet another example, the driving device 184 may unfold or spread out at least a portion of the plurality of display elements DSa to DSn by air injection.

Meanwhile, the display 180 also may be configured as a touchscreen and used as an input device as well as an output side.

The audio output device (not shown) receives a signal audio-processed by the signal processing device 170 and outputs it as audio.

The power supply device 190 supplies corresponding electric power across the entire display device 100. In particular, the power supply device 190 may supply electric power to the signal processing device 170 which can be implemented in the form of a system on chip (SOC), the display for video display, the audio output device (not shown) for audio output, and so on.

Specifically, the power supply device 190 may have a converter for converting alternating current voltage into direct current voltage and a dc/dc converter for converting the level of direct current voltage.

Meanwhile, the block diagram of the display device 100 illustrated in FIG. 3 is a block diagram for an embodiment of the present disclosure. Each of the components in the block diagram may be integrated, added, or omitted depending on a specification of the display device 100 that is actually implemented. That is, if necessary, two or more components may be combined into one component, or one component may be divided into two or more components. In addition, a function performed in each block is for describing the embodiment, and the particular operation or device does not limit the scope of the disclosure.

Meanwhile, the display device 100 according to an embodiment of the present disclosure relates to a transforming display device 100 in which the display 180 with a plurality of display elements can be transformed in 3 dimensions by getting twisted, if necessary, based on the principles of paper folding.

Conventional displays are a foldable, curved, or rollable structure based on a 2-dimensional plane.

However, the display device 100 according to an embodiment of the present disclosure allows the display 180 with a plurality of display elements to be transformed in 3 dimensions by getting twisted, based on its rotation on an xy plane and its upward movement in the z-axis direction.

FIG. 4A to FIG. 9B are views referred to for describing the display device of FIG. 1B.

Figure 4A:
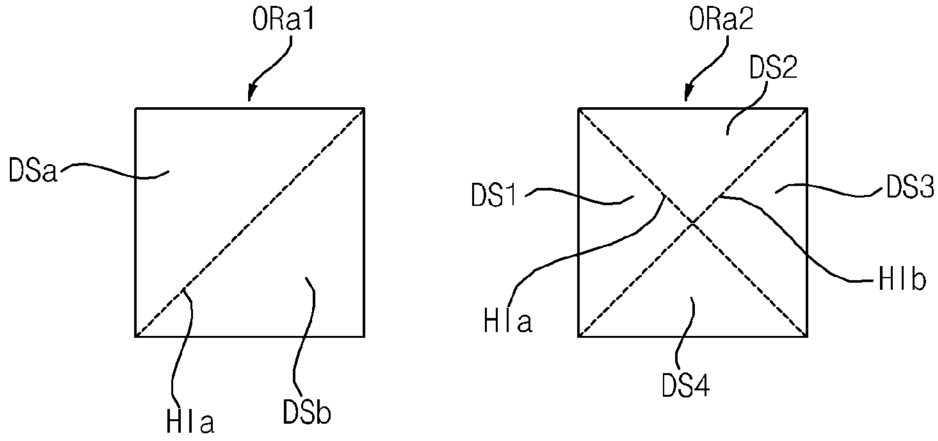
FIG. 4A to FIG. 9B are views referred to describe the display device of FIG. 1B.

The square-shaped display ORa1 of FIG. 4A may have triangular display elements DSa and DSb which are folded inward or outward with respect to one diagonal hinge HIa.

On the other hand, the square-shaped display ORa2 may have triangular display elements DS1, DS2, DS3, and DS4 which are folded inward or outward with respect to two diagonal hinges HIa and HIb.

Figure 4B:
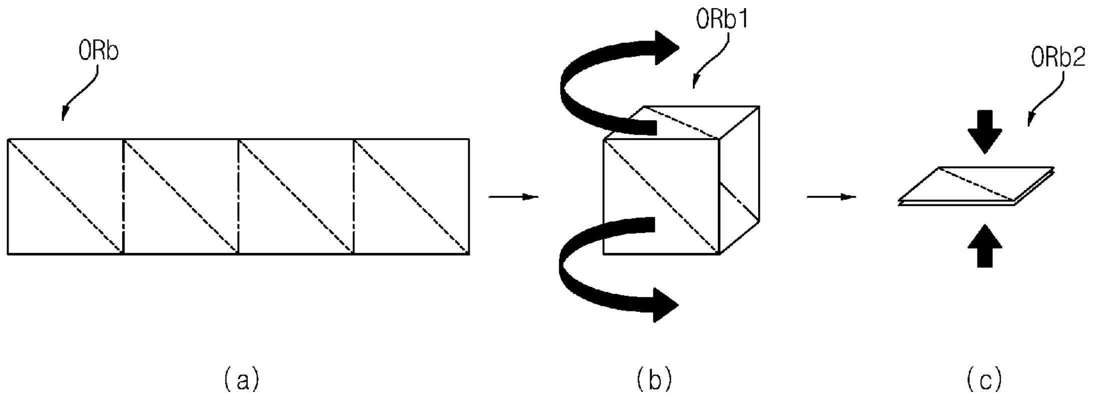

As shown in FIG. 4B, two right triangular display elements may be combined into a square display element shape, and the left and right outer edges of a rectangle of four square display elements laid out in a line ORb may be joined together to form a 3-dimensional cuboid ORb1 having four display surfaces.

As shown in FIG. 4B, when the top and bottom faces of the cuboid are turned in opposite directions, the lateral faces are folded along the face diagonals, causing the top face to move up and the bottom face to move down and then resulting in a double-sided display shape ORb2 having a front face and a rear face.

Conversely, when the top and bottom faces are turned in different directions and become separated, a cuboid shape ORb1 may be formed.

Figure 4C:
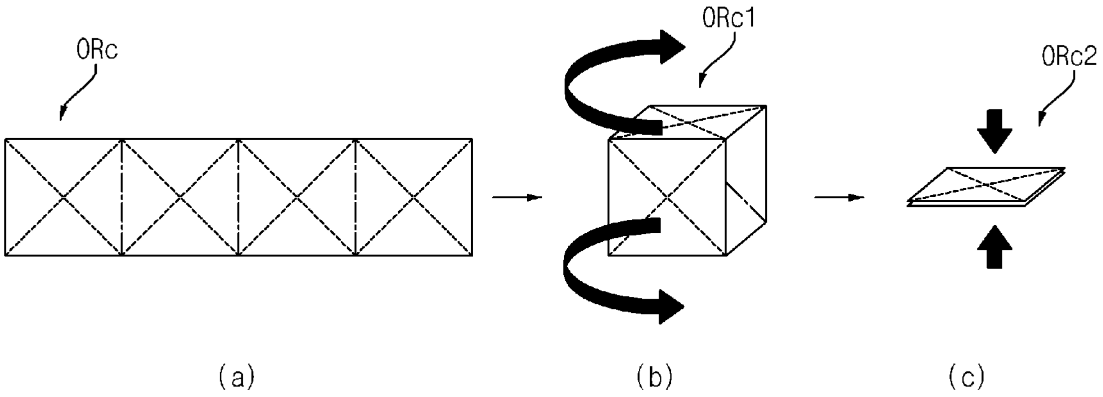

As shown in FIG. 4C, four right triangular display elements may be combined into a square display element shape, and the left and right outer edges of a rectangle of four square display elements laid out in a line ORc may be joined together to form a four-sided display cuboid ORc1.

Meanwhile, when the top face of the cuboid ORc1 is turned clockwise and the bottom face thereof is turned counterclockwise, the lateral faces are folded along the face diagonals, causing the top face to move up and the bottom face to move down and then resulting in a double-sided display shape ORc2 having a front face and a rear face.

Conversely, when the top and bottom faces are turned in different directions and become separated, a cuboid shape ORc1 may be formed.

Figure 4D:
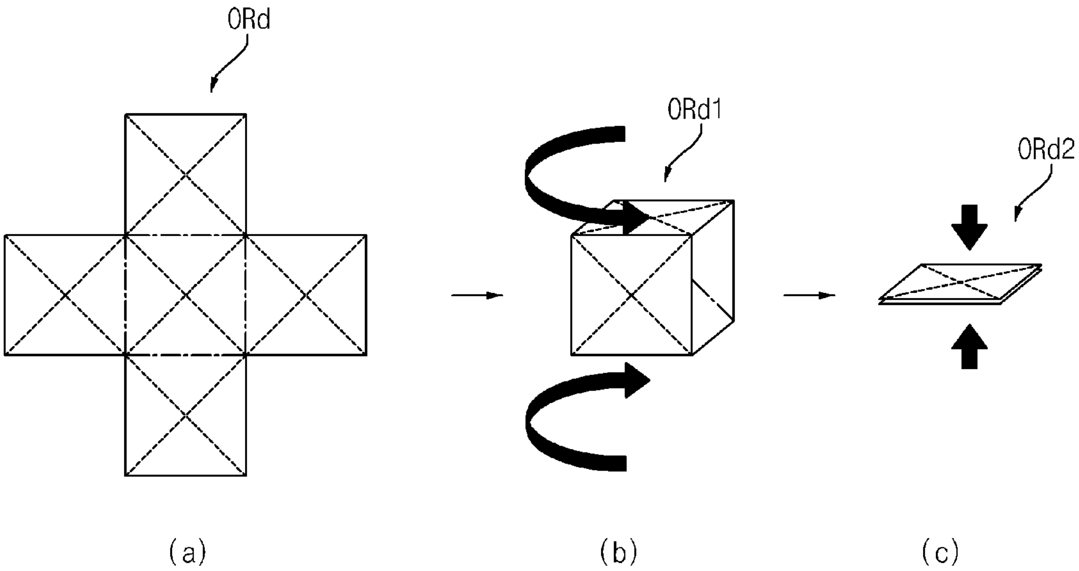

As shown in FIG. 4D, five square display elements laid out in the shape of a cross ORd may be formed into a five-sided display cuboid ORd1.

Meanwhile, when the top face of the cuboid ORd1 is turned clockwise and the bottom face thereof is turned counterclockwise, the lateral faces are folded along the face diagonals, causing the top face to move up and the bottom face to move down and forming a double-sided display shape ORd2 having a front face and a rear face.

Conversely, when the top and bottom faces are turned in different directions and become separated, a cuboid shape ORd1 may be formed.

Figure 4E:
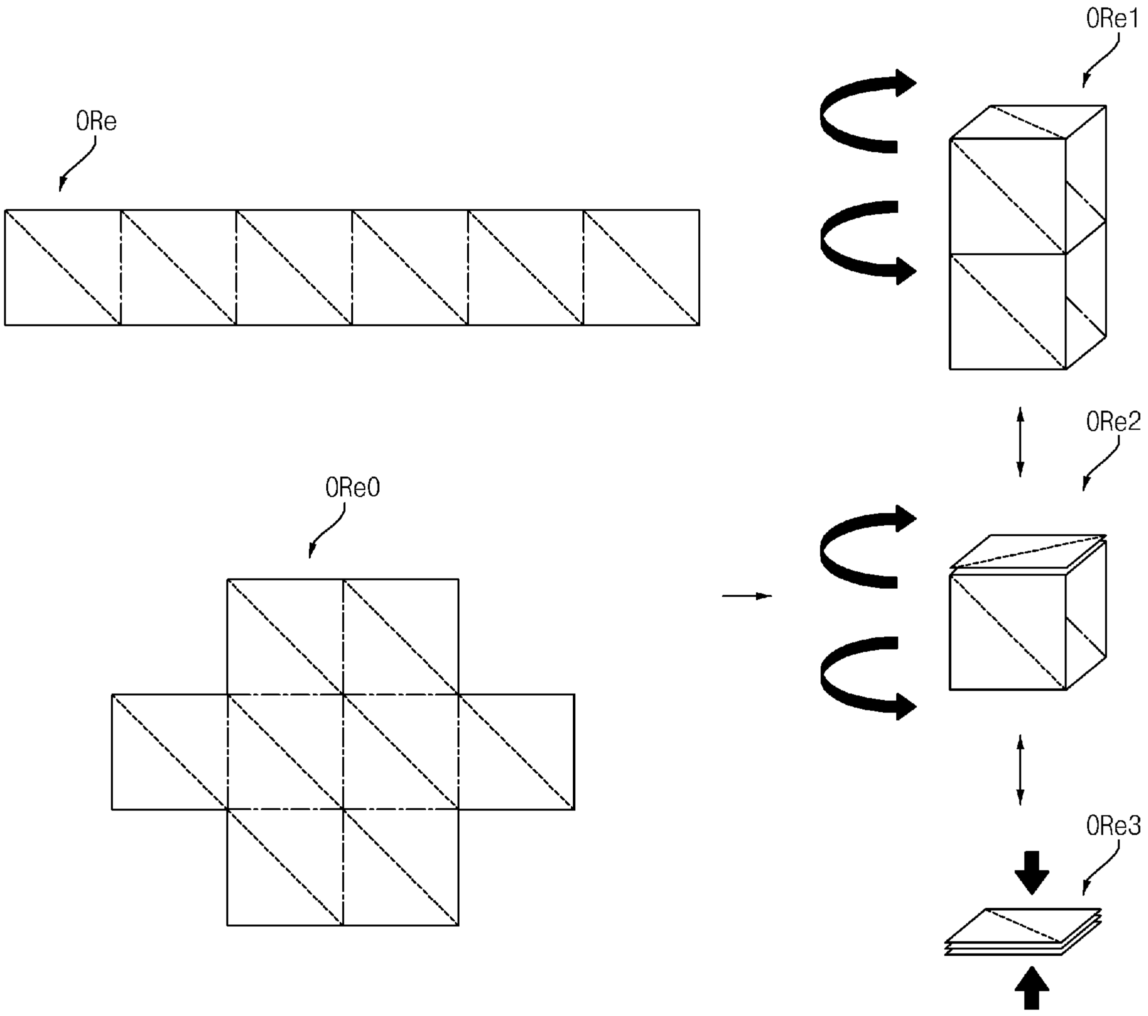

As shown in FIG. 4E, two right triangular display elements may be combined into a square display element shape, and the left and right outer edges of a rectangle of six square display elements laid out in a line ORe may be joined together to form a 2-tiered, 3-dimensional cuboid ORe1 having six display surfaces.

On the other hand, as shown in FIG. 4E, two right-angle triangular display elements may be combined into a square display element shape, and eight square display element laid out in the shape of a cross ORe0 may be formed into two 2-tiered, 3-dimensional cuboid ORe1 having six display surfaces.

Meanwhile, when the top and bottom faces of the 2-tiered, 3-dimensional cuboid ORe1 are turned in opposite directions, the lateral faces are folded along the face diagonals, causing the top face to move up and the bottom face to move down and then resulting in a 1-tiered, 3-dimensional cuboid ORe2 as one of the two cuboids collapses.

Meanwhile, when the top face and bottom face of the 1-tiered, 3-dimensional cuboid ORe2 are turned in the same direction, a 2-tiered, 3-dimensional cuboid ORe1 may be formed.

On the other hand, when the top face and bottom face of the 1-tiered, 3-dimensional cuboid ORe2 are turned in opposite directions, the lateral faces are folded along the face diagonals, causing the top face to move up and the bottom face to move down and then resulting in a double-sided display shape ORe3 having a front face and a rear face as the cuboid collapses.

Conversely, when the top and bottom faces are turned in different directions and become separated, a 1-tiered cuboid shape ORe2 may be formed, and repeating the same operation may result in a 2-tiered cuboid ORe1.

Meanwhile, four right triangular display elements may be combined into a square display element shape.

Meanwhile, although not shown, two or more cuboid structures with rectangular faces each consisting of two or more right triangular display elements may be converted into a polygonal structure.

For example, when the cuboid at the center of five cuboids laid out in a line is moved down and the cuboids at opposite sides are moved up, the face diagonals are folded inward, thus forming a heart-shaped or V-shaped polygonal structure. Also, more than five cuboids may be formed into various polygonal structures.

Figure 5A:
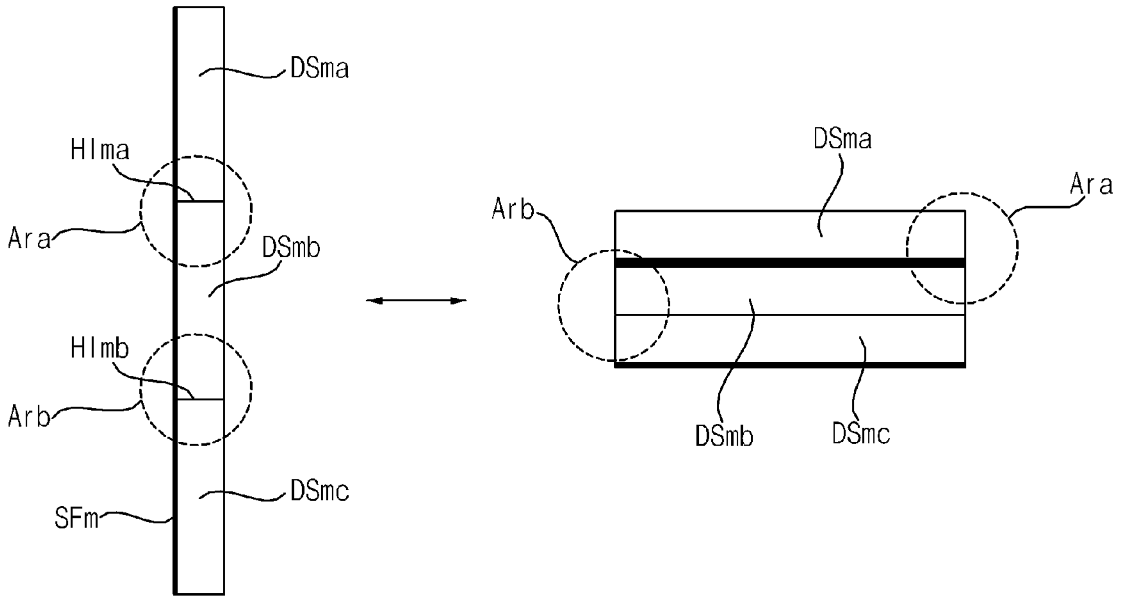

FIG. 5A illustrates that hinges HIma and HImb are disposed between first to third display elements DSma, DSmb, and DSmc.

In the display device 100 according to an embodiment of the present disclosure, as shown in FIG. 5A, the first to third display elements DSma, DSmb, and DSmc which have some thickness to them may be in a folded state, and then the first to third display elements DSma, DSmb, and DSmc may be unfolded or spread out. Particularly, they may be seamlessly folded into a minimum volume.

To this end, when the unfolded first to third display elements DSma, DSmb, and DSmc are folded inward or outward, a spring and a magnet may be attached to the hinges HIma and HImb together or separately.

Meanwhile, FIG. 5A illustrates that the first to third display elements DSma, DSmb, and DSmc are folded or unfolded in a vertical direction. That is, the first to third display elements DSma, DSmb, and DSmc may have a horizontal surface and a vertical surface, and the hinges HIma and HImb may be formed on the horizontal surface.

Figure 5B:
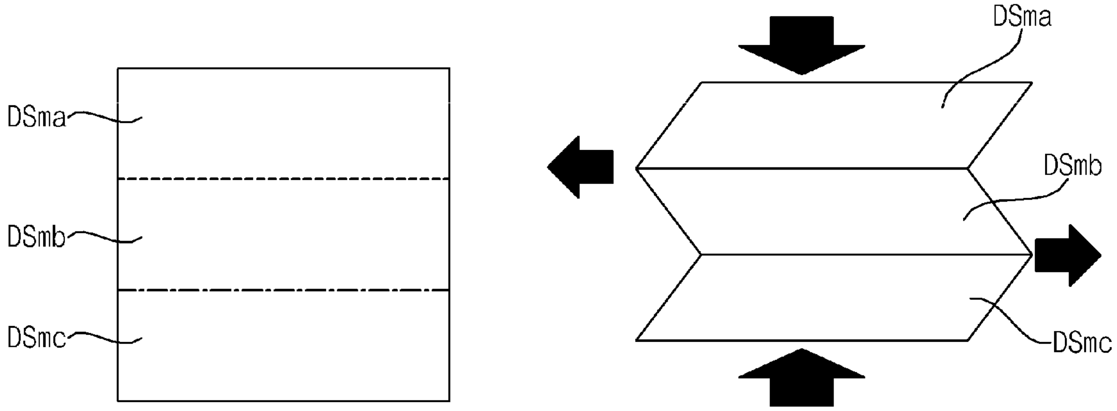

Next, FIG. 5B illustrates that the first to third display elements DSma, DSmb, and DSmc are folded or unfolded in a horizontal direction. That is, the first to third display elements DSma, DSmb, and DSmc may have a horizontal surface and a vertical surface, and the hinges HIma and HImb may be formed on the vertical surface.

Meanwhile, a display element may be joined to at least one neighboring display element, and the joined display elements may be folded outward, i.e., in the opposite direction.

In particular, as shown in FIG. 5B, once a display element and its immediate neighboring display element are folded inward, a subsequent neighboring display element is preferably folded outward, i.e., in the opposite direction.

Figure 5C:
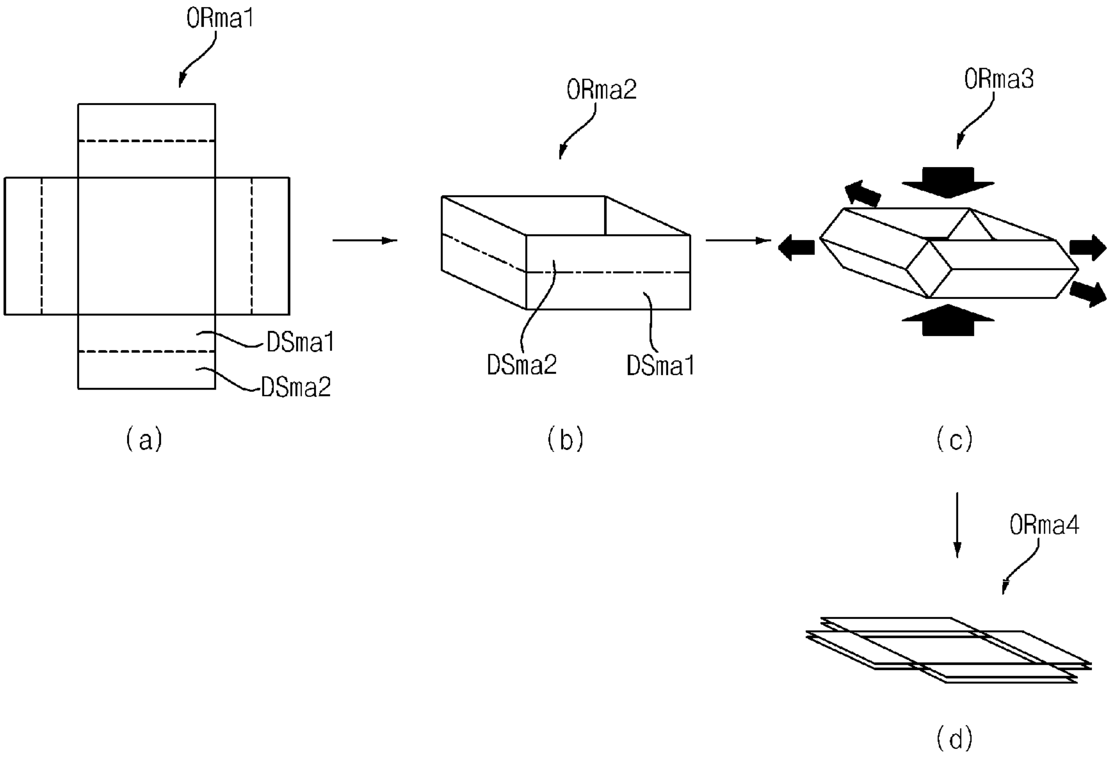

FIG. 5C illustrates that at least two rectangular display elements DSma1 and DSma2 on a plane ORma1 may be combined into one rectangular face, and that four rectangular faces are formed on the lateral sides of the cuboid ORma2.

As shown in FIG. 5C, a cuboid having four rectangular display elements may be formed in such a way that neighboring rectangular display elements on each side are folded outward from the cuboid.

Meanwhile, as shown in FIG. 5C, all of four lateral faces ORma3 joined together may vertically collapse to ORma4 as they are folded outward, with a square space formed at the center.

Figure 5D:
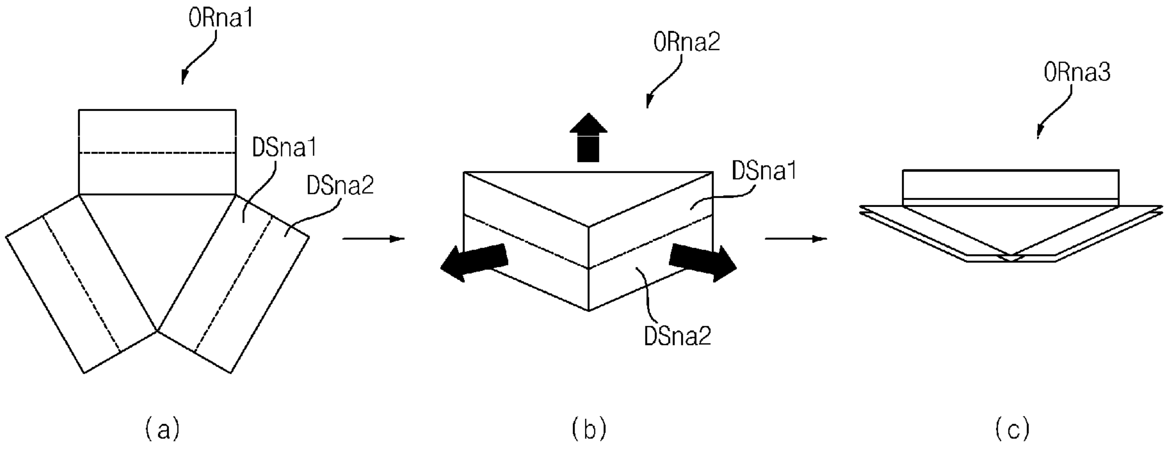

FIG. 5D illustrates that rectangular display elements DSna1 and DSna2 on a plane ORna1 are formed into a polyhedron ORna2 with three lateral faces that are foldable outward.

As shown in FIG. 5D, at least two rectangular display elements may be combined into one rectangular face, and three rectangular faces may be formed on the lateral sides of the pentahedron.

As shown in FIG. 5D, the pentahedron may be transformed in such a way as to collapse vertically as two neighboring display elements are folded inward and outward, respectively, in the same direction, with a triangular space formed at the center.

Figure 6A:
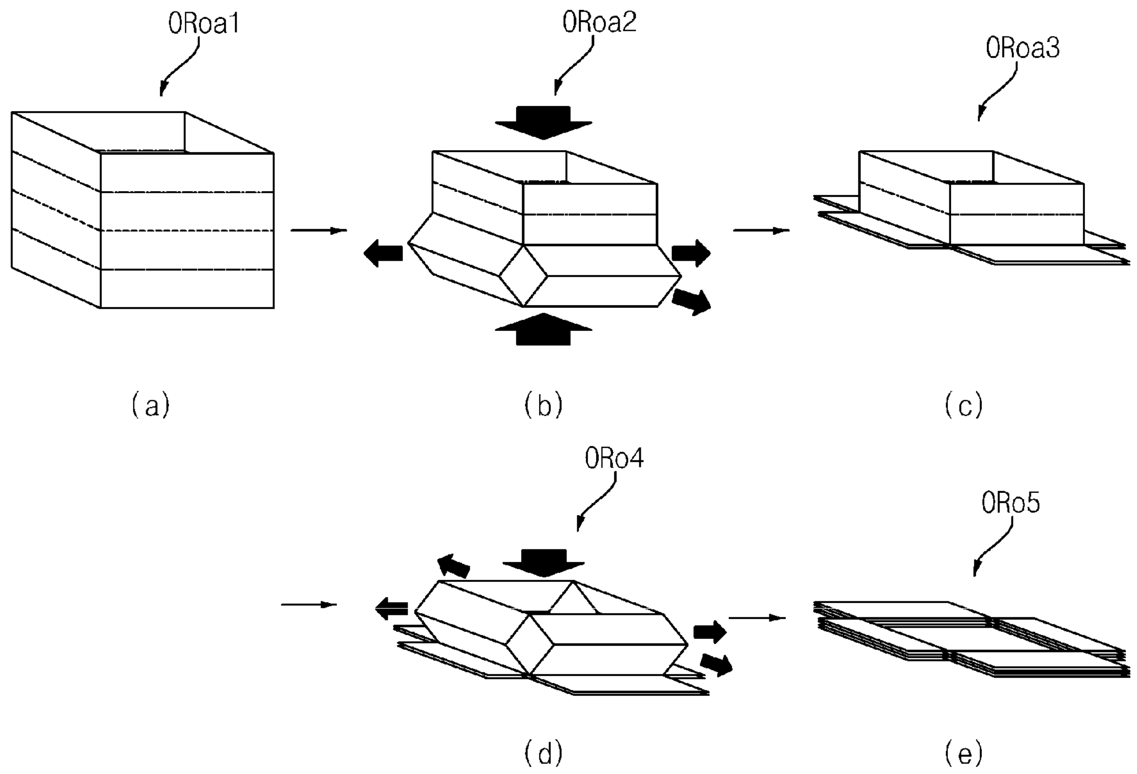

FIG. 6A illustrates a 4-tiered, 3-dimensional cuboid display structure ORoa1.

As shown in FIG. 6A, a multi-tiered, 3-dimensional column-like display device may be formed as a variation of the three-dimensional cuboid display structure.

The drawing illustrates a vertical, 3-dimensional column-like display device which has four lateral faces, each being one rectangular face made up of an arrangement of two or more neighboring rectangular display elements joined together.

Meanwhile, as shown in FIG. 6A, the 3-dimensional cuboid display structure ORoa1 may be transformed in stages. Accordingly, the 4-tiered structure ORoa1 may collapse to ORoa2, ORoa3, ORoa4, and ORoa5.

That is, the column may fall down one level as the four lateral faces at the bottom tier are folded outward in four directions, and then the column may be reduced in height as the four lateral faces at the tier right above the bottom tier are folded.

Moreover, in the case of a ceiling-type system, the column may collapse from the top as the tier at the top is folded in stages.

Figure 6B:
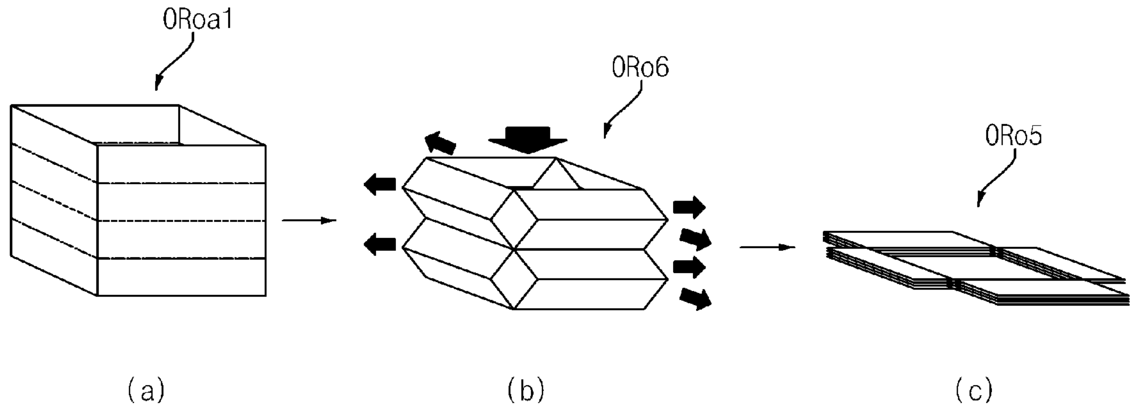

FIG. 6B illustrates that the column collapses as the four lateral faces of the 4-tiered, 3-dimensional cuboid display structure ORoa1 are simultaneously folded in four directions.

Accordingly, the 4-tiered structure ORoa1 may be collapse to ORoa6 and ORoa5.

Figure 6C:
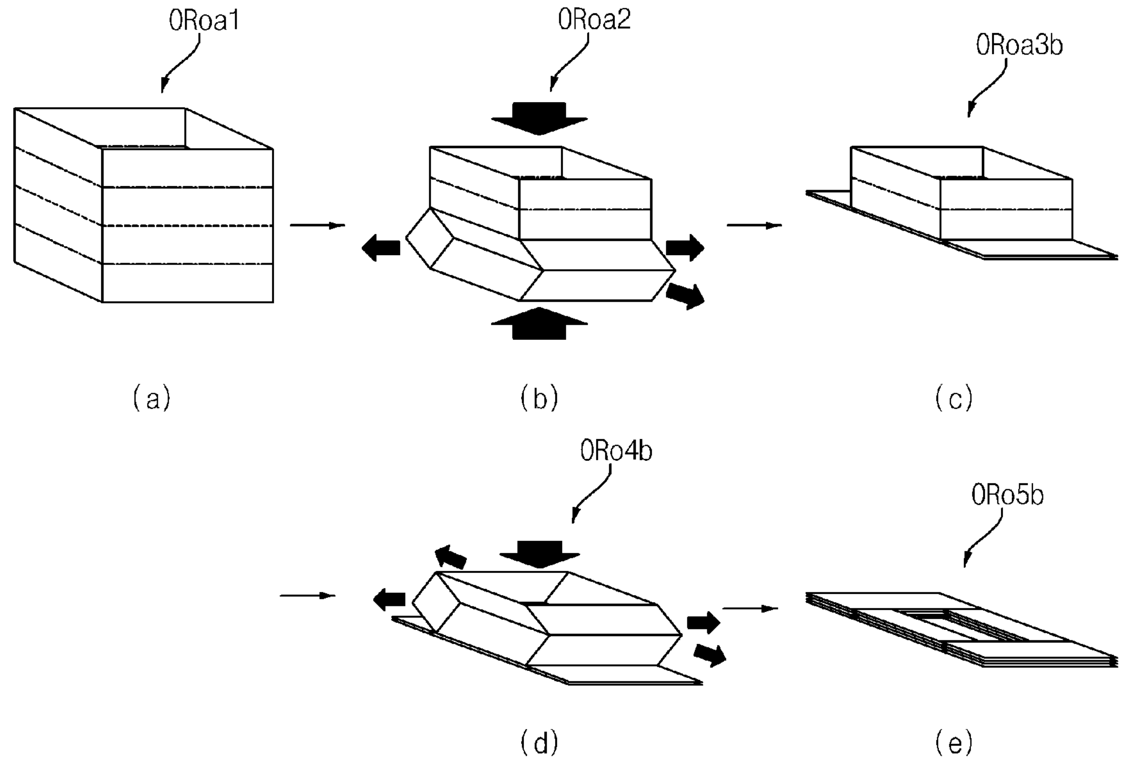

FIG. 6C illustrates a vertical, 3-dimensional column-like transformable display device OROa1 which has four lateral faces, each being one rectangular face made up of an arrangement of two or more neighboring rectangular display elements joined together.

As shown in FIG. 6C, the column may be transformed in stages. Accordingly, the 4-tiered structure ORoa1 may collapse to ORoa2, ORoa3*b*, ORoa4*b*, and ORoa5*b*.

That is, the column may collapse one level as the four lateral faces at the bottom tier are folded outward in four directions, and then the column may continue to decrease in height as the four lateral faces at the tier right above the bottom tier are folded.

Moreover, in the case of a ceiling-type system, the column may decrease in height as the tiers are folded in stages from the top down.

Figure 6D:
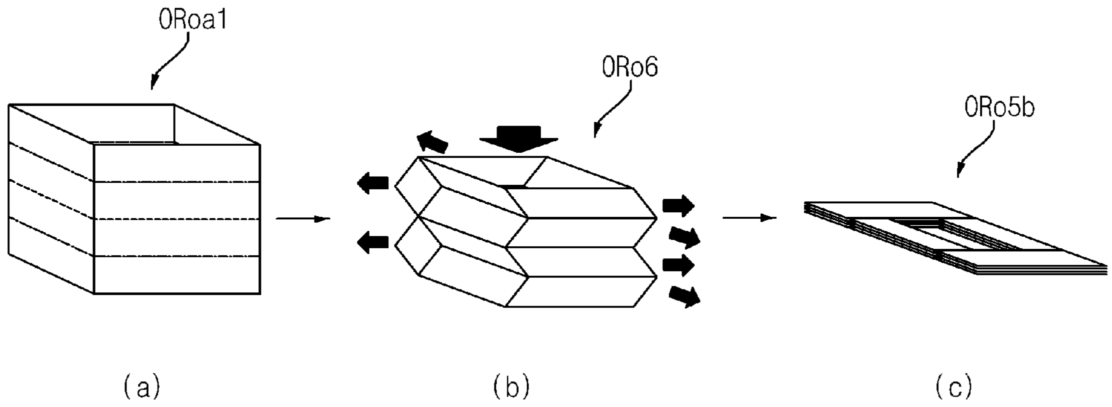

Meanwhile, FIG. 6D illustrates that the column collapses as the four lateral faces are simultaneously folded in four directions.

Accordingly, the 4-tiered structure ORoa1 may be collapse to ORoa6 and ORoa5*b*.

Figure 7A:
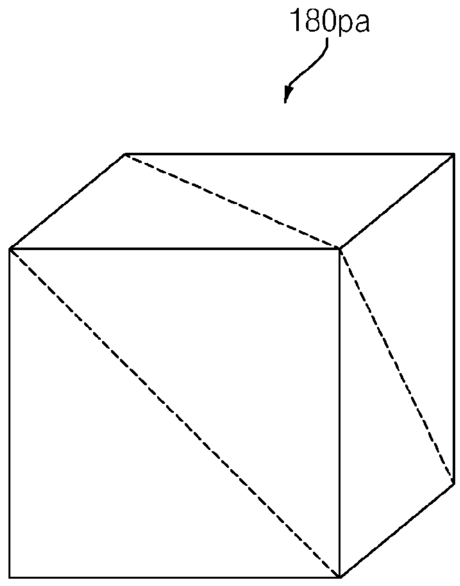

FIG. 7A is a view referred to for describing an origami-type, 3-dimensionally transformable display device.

Referring to the drawing, a tangent line to a horizontal direction, a tangent line to a depth direction, a tangent line to a height direction, a tangent line to a diagonal direction, etc. may exist in the hexahedron.

For example, once neighboring display elements in the hexahedron are folded inward, a subsequent neighboring display element may be folded outward.

In particular, if a display element has three or more foldable tangent lines, the display element cannot be folded while being kept flat, and this obstructs the display element when the corners of the hexahedron are folded.

In this regard, the present disclosure proposes the joining of neighboring display elements, at least one of which is separated, and which are joined after transformation.

Figure 7B:
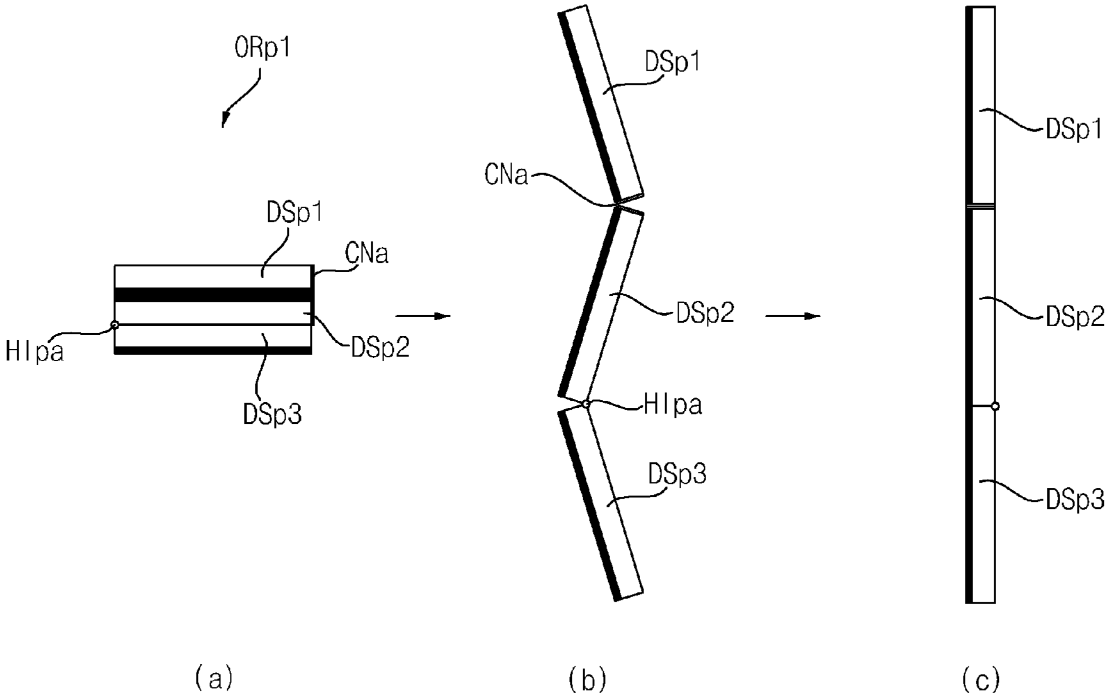

FIG. 7B illustrates a structure ORp1 in which a connecting member CNa is disposed between first and second display elements DSp1 and DSp2 and a hinge HIpa is disposed between second and third display elements DSp2 and DSp3.

In particular, the drawing illustrates that the vertical surfaces of the first to third display elements DSp1 to DSp3 are folded against each other or abut on each other.

For example, it is preferable that the hinge HIpa is disposed in an area where the display elements DSp2 and DSp3 are folded outward, and that the connecting member CNa is disposed in an area where the display elements DSp1 and DSp2 are folded inward.

The hinge HIpa may adjust force when folding or unfolding, as well as acting as a basic guide for folding or unfolding.

In particular, a spring, a motor STM, an actuator, etc. may be attached together or separately in order to adjust force.

The connecting member CNa may be a thin film, and may be attached to the first and second display elements DSp1 and DSp2 so that they become separated without interference.

Moreover, the connecting member CNa may guide a display element so that it is unfolded and keeps contact with an adjoining surface of a neighboring display element.

Therefore, the connecting member CNa is preferably a shrinkable or expandable material that can return to its original state after being stretched.

Meanwhile, the first to third display elements DSp1, DSp2, and DSp3 may overlap each other in the first mode, as shown in (a) of FIG. 7B.

Next, the first to third display elements DSp1, DSp2, and DSp3 are unfolded in a line in the second mode, as shown in (b) through (c) of FIG. 7B.

A connecting member CNa with elasticity may be disposed between the first display element DSp1 and the second display element DSp2, and a hinge HIpa may be disposed between the second display element DSp2 and the third display element DSp3.

Accordingly, it is possible to implement a display device that can be folded or unfolded by using a plurality of display elements.

Meanwhile, a display surface may be formed on front faces of the second display element DSp2 and the third display element DSp3 which are opposite sides of the rear faces contacting the hinge HIpa. In (c) of FIG. 7B, the display surface is indicated by a thick line.

Accordingly, it is possible to implement a display device that can be folded or unfolded by using a plurality of display elements.

Figure 7C:
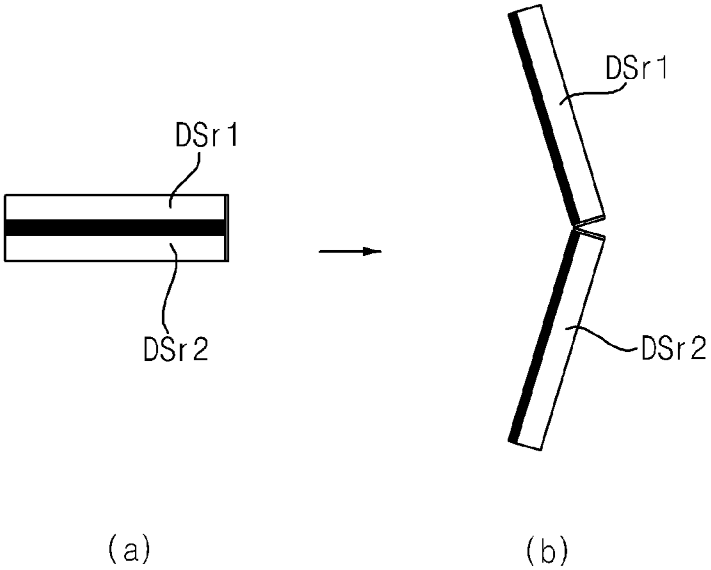
Figure 7D:
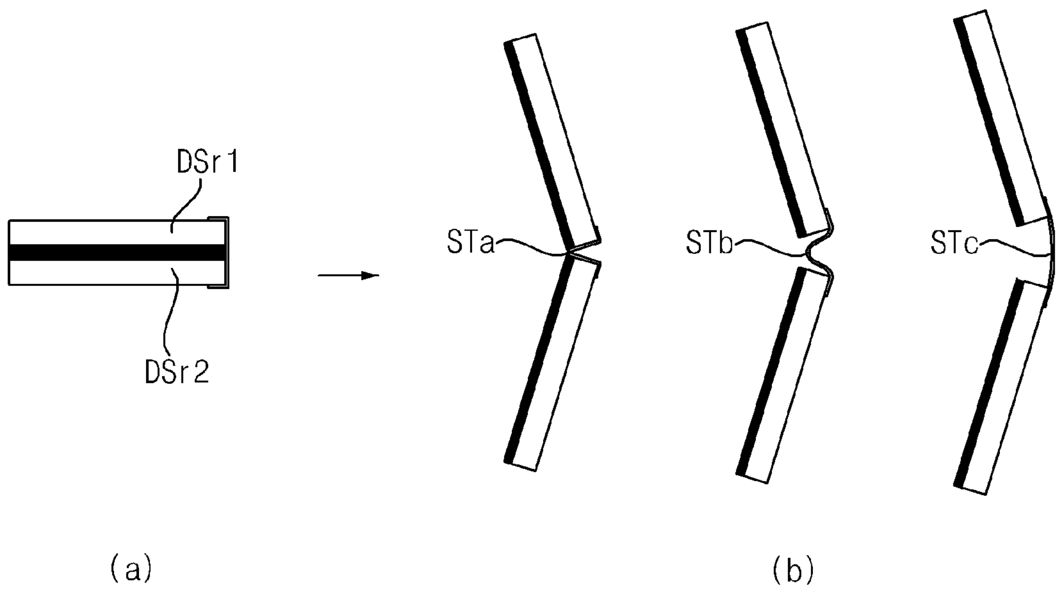

FIGS. 7C and 7D illustrate that a connecting member is disposed between two display elements DSr1 and DSr2.

In particular, FIG. 7C illustrates that a connecting member is attached to lateral faces of the two display elements DSr1 and DSr2.

On the other hand, FIG. 7D illustrates that a connecting member is attached to top faces of the two display elements DSr1 and DSr2.

The drawings illustrate that the size of the connecting member increases to STa, STb, and STc as the distance between the two display elements DSr1 and DSr2 becomes larger.

Meanwhile, a supporter and a frame mechanism for retaining shape may be attached to the rear faces of the display elements.

The supporter and the frame mechanism preferably have the same area as the size of the display elements or a smaller area than it.

The supporter and the frame mechanism preferably maintain the frame so as to prevent the display elements from bending.

Meanwhile, the supporter and the frame mechanism may be used to keep the display elements flat.

For example, the frame mechanism preferably has a structure in which the display elements do not interfere with each other when folded inward or outward.

Moreover, it is preferably implemented as a seamless structure in which there is no gap between the display elements when the frame is maintained.

Examples of the frame mechanism may include an electromagnet or a magnet.

Meanwhile, an electromagnet or a magnet may be disposed on a rear face of a display element PAs.

Meanwhile, an electromagnet or a magnet may be disposed in a line on the rear face of the display element PAs.

Alternatively, a plurality of electromagnets or magnets may be disposed on the rear face of the display element PAs, spaced apart from one another. This will be described with reference to FIGS. 8A to 8D.

Figure 8A:
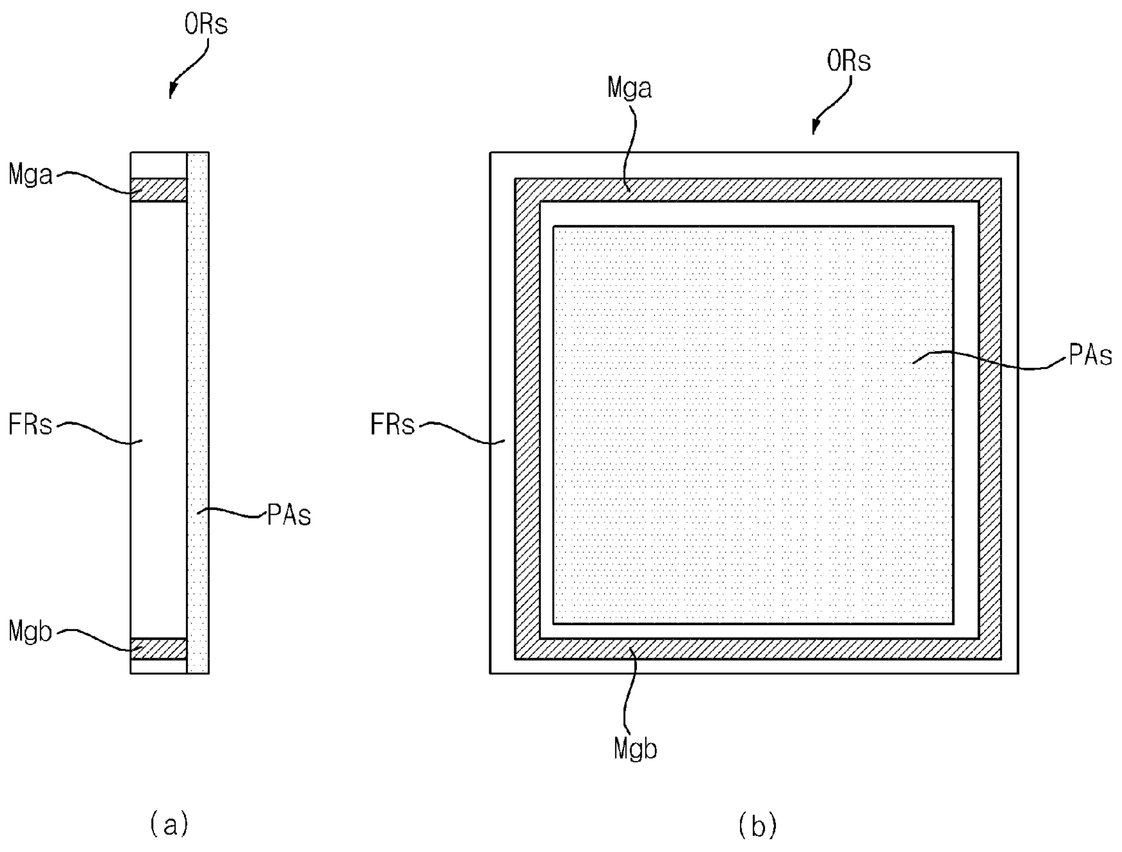
Figure 8B:
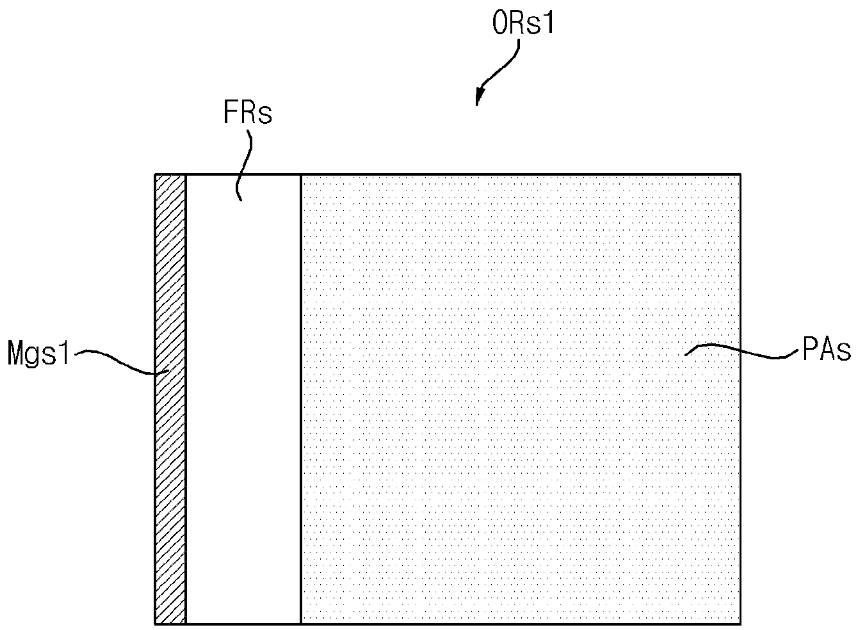
Figure 8C:
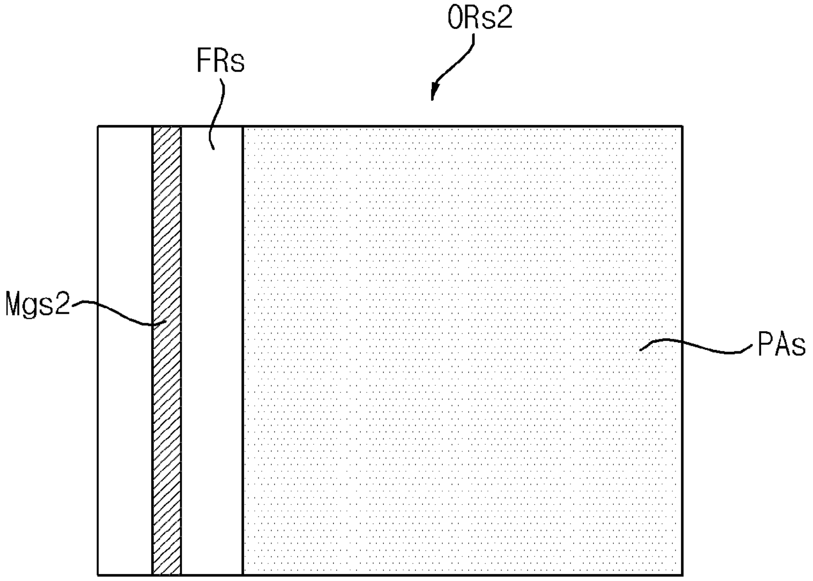
Figure 8D:
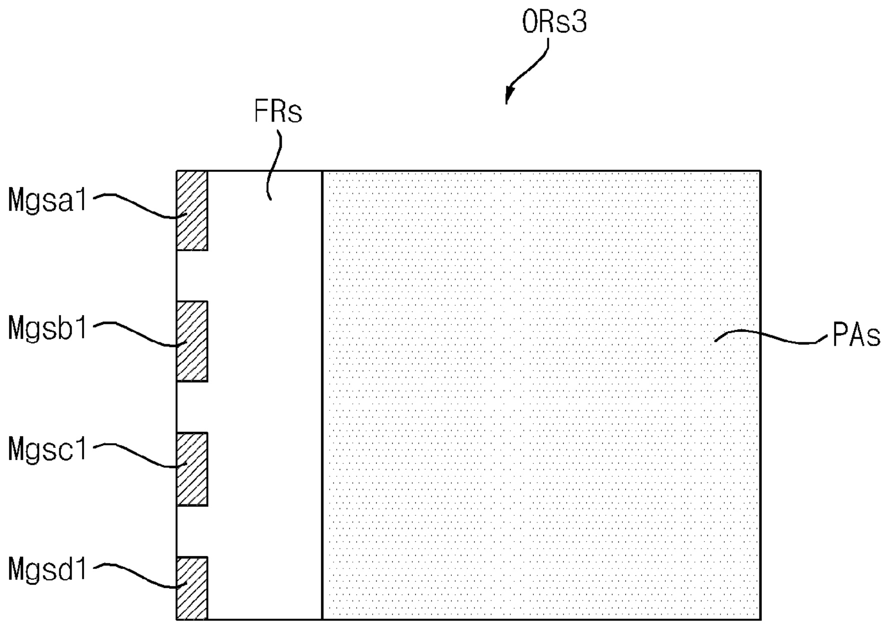

FIGS. 8A and 8D are views referred to for describing a supporter and a frame mechanism.

First, (a) of FIG. 8A depicts a lateral side of a display device ORs including a display element PAs and a back side of the display device ORs including the display element PAs.

Referring to the drawing, a supporter FRS may be disposed on a rear face of the display element PAs, and magnets Mga and Mgb to be embedded may be disposed on upper and lower sides of the supporter FRS.

The magnets Mga and Mgb may be an example of the frame mechanism, and the magnets Mga and Mgb may prevent damage when the display element PAs is folded or unfolded, as well as keeping the display element PAs flat.

FIG. 8B illustrates a display device ORs1 with a supporter FRS disposed on a rear face of a display element PAs and a linear magnet MGs1 disposed on a rear face of the supporter FRS. The magnet MGs1 may prevent damage when the display element PAs is folded or unfolded, as well as keeping the display element PAs flat.

FIG. 8C illustrates a display device ORs2 with a supporter FRS disposed on a rear face of a display element PAs and a linear magnet MGs1 embedded in the supporter FRS. The magnet MGs1 may prevent damage when the display element PAs is folded or unfolded, as well as keeping the display element PAs flat.

FIG. 8D illustrates a display device ORs3 with a supporter FRS disposed on a rear face of a display element PAs and a plurality of magnets MGsa1, MGsb1, MGsc1, and MGsd1 disposed on a rear face of the display element PAs, spaced apart from one another. The magnets MGsa1, MGsb1, MGsc1, and MGsd1 may prevent damage when the display element PAs is folded or unfolded, as well as keeping the display element PAs flat.

Figure 8E:
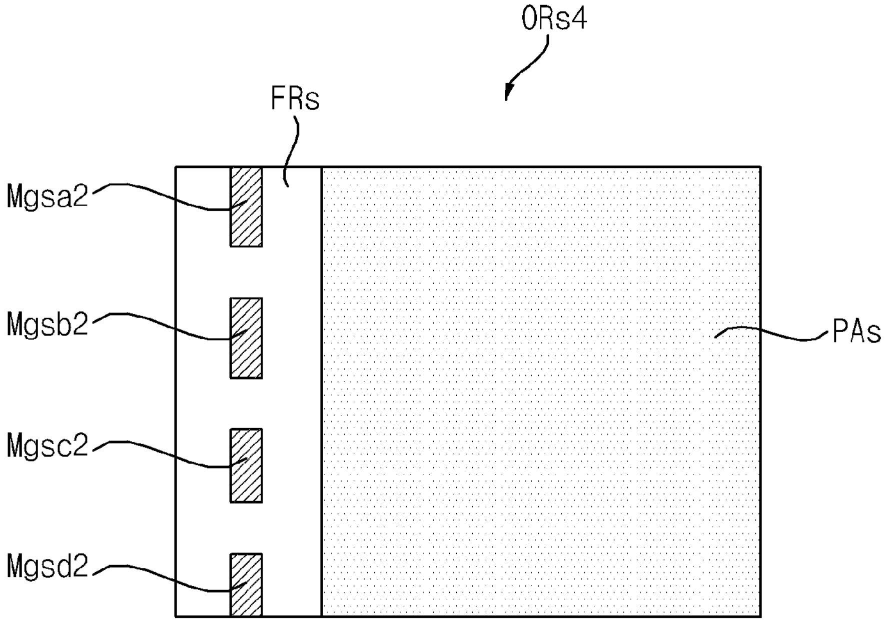

FIG. 8E illustrates a display device ORs4 with a supporter FRS disposed on a rear face of a display element PAs and a plurality of magnets MGsa2, MGsb2, MGsc2, and MGsd2 embedded in the supporter FRS, spaced apart from one another.

In this case, the magnets MGsa2, MGsb2, MGsc2, and MGsd2 may be larger in size in a vertical direction than in a horizontal direction.

The magnets MGsa2, MGsb2, MGsc2, and MGsd2 may prevent damage when the display element PAs is folded or unfolded, as well as keeping the display element PAs flat.

Figure 8F:
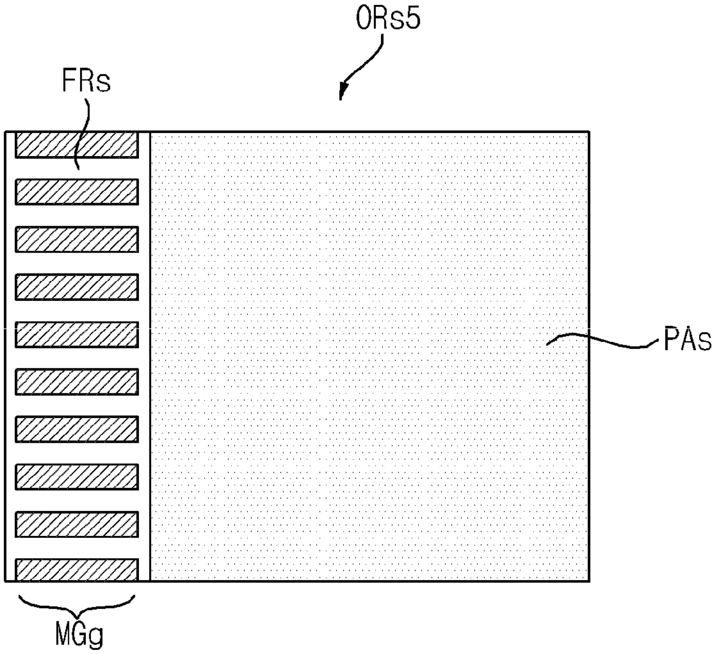

FIG. 8F illustrates a display device ORs5 with a supporter FRS disposed on a rear face of a display element PAs and a plurality of magnets MGg embedded in the supporter FRS, spaced apart from one another.

In this case, the magnets MGg may be larger in size in a horizontal direction than in a vertical direction.

The magnets MGg may prevent damage when the display element PAs is folded or unfolded, as well as keeping the display element PAs flat.

Figure 9A:
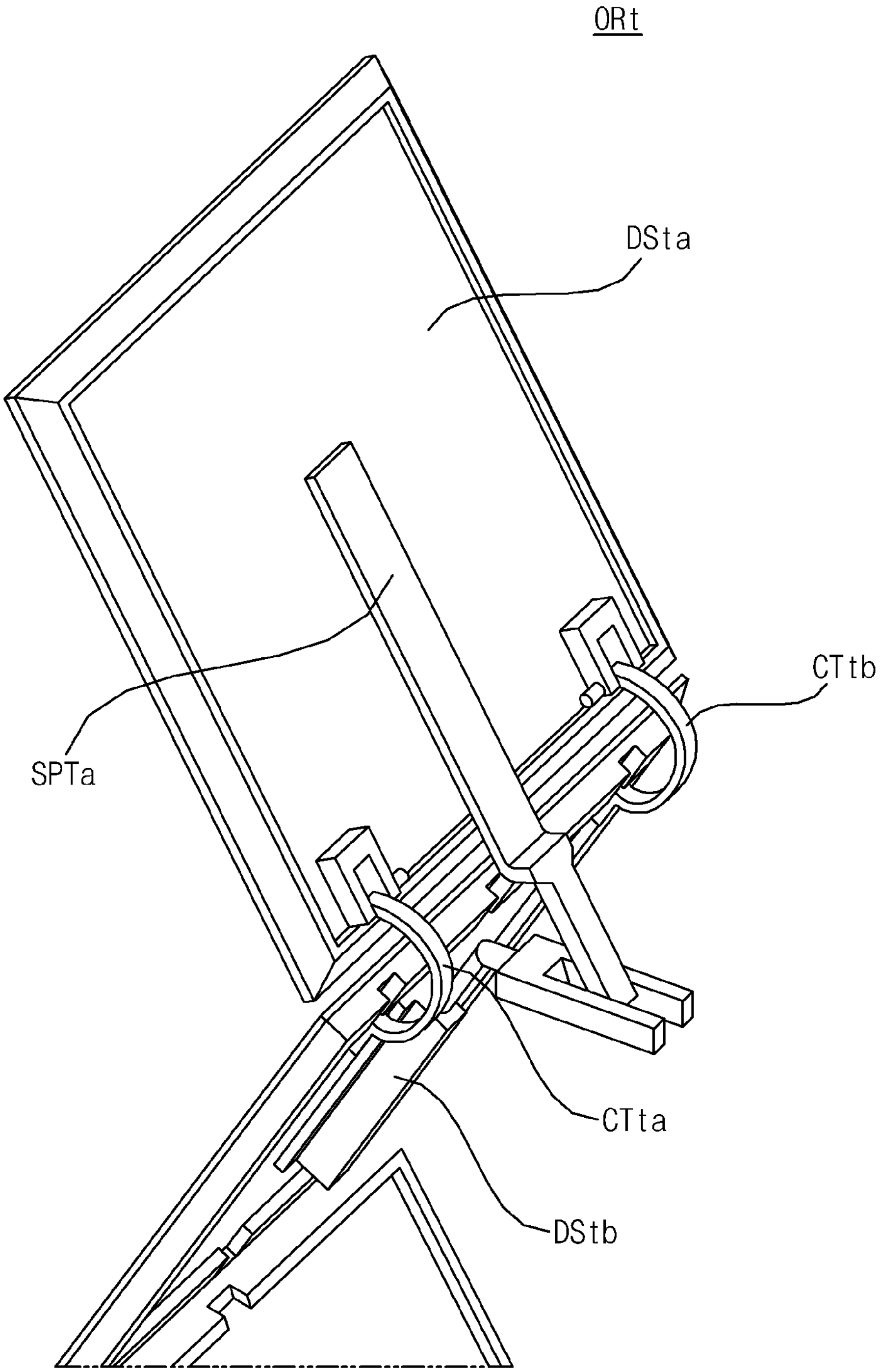
Figure 9B:
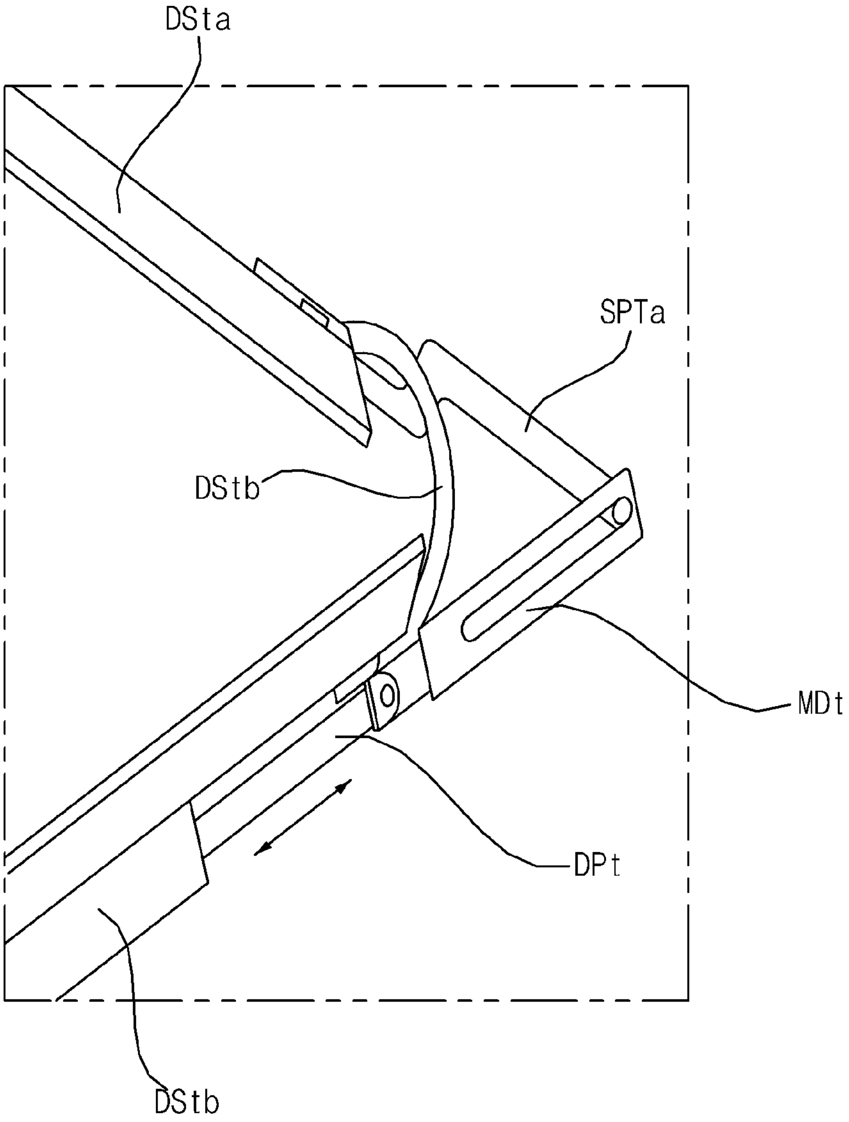

FIGS. 9A and 9B illustrate a display device Ort with hinges CTta and CTtb disposed between first and second display elements DSta and DStb adjacent to each other.

Referring to the drawings, at least one hinge CTta and CTtb may be disposed between the first and second display elements DSta and DStb adjacent to each other. The drawings illustrate two hinges CTta and CTtb.

Meanwhile, when folding the first and second display elements DSta and DStb based on rotation which have some thickness to them, the first and second display elements DSta and DStb need to be pulled slightly apart before being folded, as opposed to thin display elements.

To this end, the hinges CTta and CTtb are preferably U-shaped hinges.

Meanwhile, an actuator is preferably used to place the first and second display elements DSta and DStb apart.

That is, as shown in FIG. 9B, a hydraulic cylinder PPt may operate by an operation of the actuator ACT, and a power transmitting member MDt connected to the supporter SPTa may be actuated by an operation of the hydraulic cylinder PPt.

Consequently, the first and second display elements DSta and DStb may be temporarily placed apart.

Accordingly, the first and second display elements DSta and DStb adjacent to each other may be folded or unfolded without damage to the first and second display elements DSta and DStb adjacent to each other.

Figure 10:
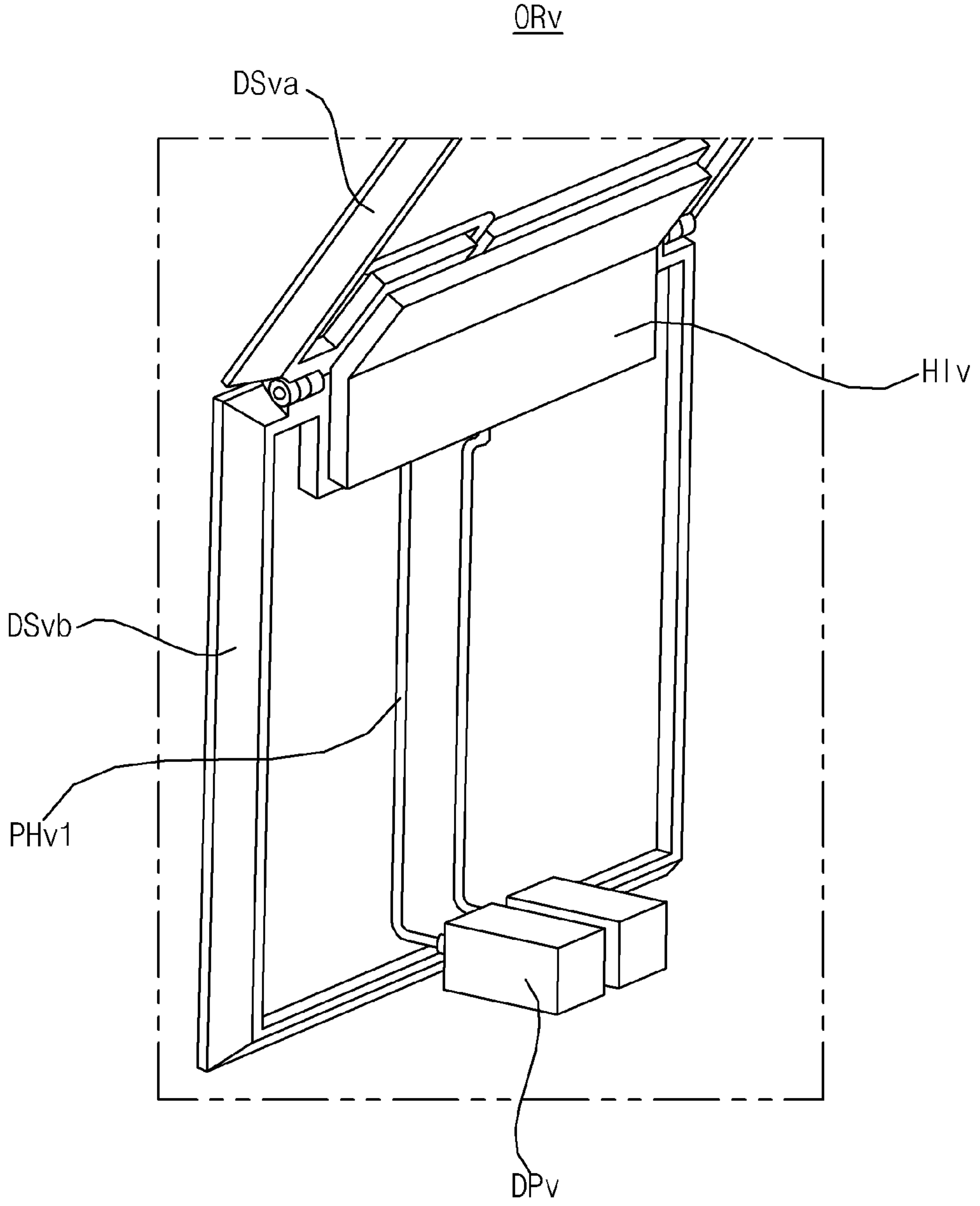
FIG. 10 is a view referred to for describing the display device of FIG. 2B.

FIG. 10 is a view referred to for describing the display device of FIG. 2B. Specifically, FIG. 10 is a view referred to for describing a hinge operation using a pumping device DPv in a similar way to FIG. 2B.

Referring to the drawing, the display device ORv may have first and second display elements DSva and DSvb adjacent to each other and a hinge HIv disposed between the first and second display elements DSva and DSvb.

Furthermore, it may have a pumping device DPv for actuating the hinge HIv and a pump hose PHv1 for delivering air from the pumping device DPv to the hinge HIv.

Accordingly, the first and second display elements DSva and DSvb adjacent to each other may be folded or unfolded without damage to the first and second display elements DSva and DSvb adjacent to each other.

Figure 11A:
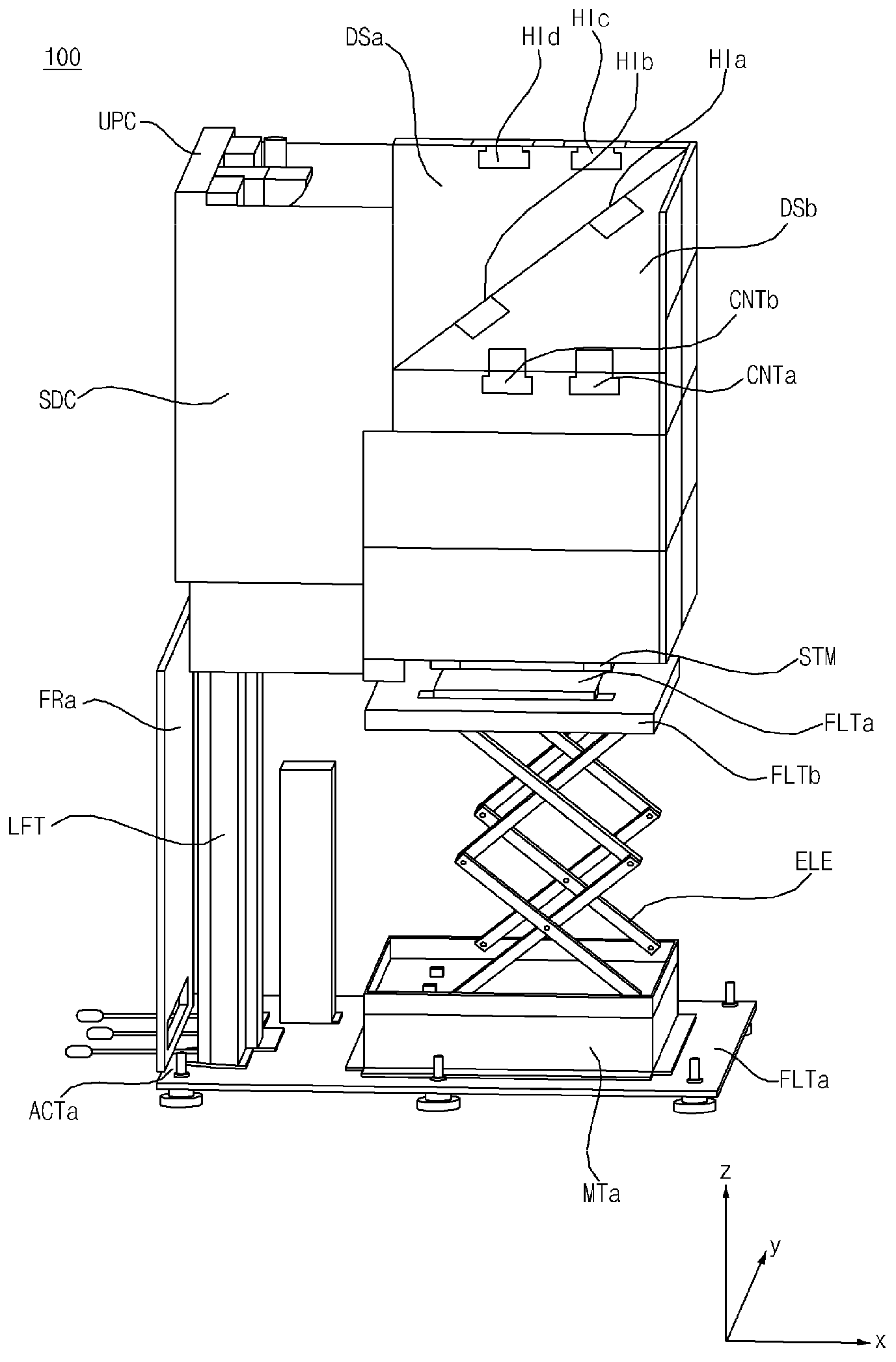
FIG. 11A is a view depicting a display device according to an embodiment of the present disclosure.

FIG. 11A is a view depicting a display device according to an embodiment of the present disclosure. FIG. 11B to FIG. 12F are views referred to for describing FIG. 11A.

Referring to the drawings, FIG. 11A is a view depicting in detail the display device of FIG. 1B.

The display device 100 according to an embodiment of the present disclosure may include a housing HOS, a plurality of display elements DSa to DSn disposed in the housing HOS in a first mode and configured to project out of the housing HOS in a second mode, and a driving device (184 in FIG. 3) for folding the plurality of display elements DSa to DSn in a first axial direction in the first mode, and unfolding at least a portion of the plurality of display elements DSa to DSn in the second mode to form a polyhedral display.

The first mode may correspond to FIG. 1A, and the second mode may correspond to FIG. 1B.

Meanwhile, the driving device 184 may include a lift LFT disposed in the housing HOS, for lifting in the first axial direction, a motor STM disposed in the housing HOS, for rotating a first plate FLTa connected to a portion of the plurality of display elements DSa to DSn, and an elevating apparatus ELE for elevating the plate FLTa in the first axial direction.

For example, when the motor STM rotates in a first rotational direction, the first plate FLTa and a portion of the plurality of display elements DSa to DSn may be unfolded and rise to a first height along the z axis, thereby implementing a 3-dimensional display device 100.

In particular, when the upper and lower faces of the display elements rotate in the same direction, i.e., the first rotational direction, a portion of the display elements in a folded state may be unfolded and rise to a first height along the z axis, thereby implementing a 3-dimensional display device 100.

On the one hand, if the motor STM rotates further in the first rotational direction, with the display elements raised to the first height on the z axis, the first plate FLTa and another portion of the plurality of display elements DSa to DSn may be unfolded and rise to a second height which is greater than the first height along the z axis, thereby implementing a 3-dimensional display device 100.

On the other hand, if the motor STM rotates further in a second rotational direction which is opposite to the first rotational direction, with the display elements raised to the second height on the z axis, the first plate FLTa and a portion of the plurality of display elements DSa to DSn may be folded and fall to the first height which is smaller than the first height along the z axis, thereby implementing a 3-dimensional display device 100.

Meanwhile, the display device 100 may further include a side cover SDC connected to a portion of the plurality of display elements DSa to DSn and an upper cover UPC connected to a portion of the plurality of display elements DSa to DSn.

Meanwhile, the upper cover UPC may be connected to the side cover SDC.

Meanwhile, the display device 100 may further include a lift LFT disposed in the housing HOS, for lifting the side cover SDC in the first axial direction, a first plate FLTa disposed in the housing HOS and connected to another portion of the plurality of display elements DSa to DSn, a motor STM disposed in the housing HOS, for rotating the first plate FLTa, a second plate FLTb disposed in the housing HOS and placed under the motor STM, and an elevating apparatus ELE disposed under the second plate FLTb in the housing HOS, for elevating the second plate FLTb in the first axial direction.

Meanwhile, the elevating apparatus ELE may rise or fall by an operation of a motor device MTa placed under it.

Meanwhile, the lift LFT may rise or fall by an operation of an actuator ACTa placed under it.

Meanwhile, as the lift LFT and the elevating apparatus ELE rise in the first axial direction and the motor STM rotates, the plurality of display elements DSa to DSn rise, so that at least a portion of the plurality of display elements DSa to DSn may be unfolded, and the upper cover UPC may cover top faces of the plurality of display elements. Accordingly, it is possible to implement a display device that can be folded or unfolded by using a plurality of display elements.

Meanwhile, first and second display elements Dsa and Dsb having a triangular shape may form a pair, thereby implementing a rectangular display.

To this end, hinges HIa and HIb may be disposed between the first and second display elements Dsa and Dsb and rotate when the first and second display elements Dsa and Dsb are folded or unfolded.

The first and second display elements Dsa and Dsb adjacent to each other may be connected by at least one hinge HIa and HIb, the first and second display elements Dsa and Dsb may be folded against each other in the first mode, and the first and second display elements Dsa and Dsb may intersect at a right angle or be unfolded with respect to the hinge HIa and HIb. Accordingly, it is possible to implement a display device that can be folded or unfolded by using a plurality of display elements.

The drawing illustrates that two hinges HIa and HIb are disposed along a diagonal line between the first and second display elements Dsa and Dsb.

Thus, the two hinges HIa and HIb are disposed at different heights on the z axis.

Meanwhile, the first and second display elements Dsa and Dsb may operate as a 1-tier display.

The display elements under the first and second display elements Dsa and Dsb may operate as a display that is on a lower tier than the first and second display elements Dsa and Dsb.

At least one flexible connector CNTa and CNTb may be disposed between display elements if the display elements are on different tiers.

The drawing illustrates that two flexible connectors CNTa and CNTb are arranged side by side at the same height between the second display element Dsb and a display element placed under the second display element Dsb.

That is, when placing two hinges between display elements on the same tier, the hinges are positioned at different heights, and when placing a flexible connector between display elements on different tiers, two flexible connectors may be positioned at the same height.

Meanwhile, the display device 100 of FIG. 11A may be configured in a $\pi$ shape.

Meanwhile, a plurality of display elements may rise or fall by means of the actuator ACTa and the step motor STM.

Meanwhile, the flexible connectors CNTa and CNTb may be used for the origami-type folding of each tier or each level.

The flexible connectors CNTa and CNTb connect first and second tiers or second and third tiers, and serve as hinges in a twist direction when a plurality of display elements rise or fall.

That is, the first and second tiers or the second and third tiers may be separated or come into contact with each other by means of the flexible connectors CNTa and CNTb.

Meanwhile, the flexible connectors CNTa and CNTb are required in order for the plurality of display elements to rise or fall, and a rigid device is required for display after the plurality of display elements has risen.

To this end, the rigid device may be implemented by using the turning on or off of an electromagnet, in addition to the hinges.

Figure 11B:
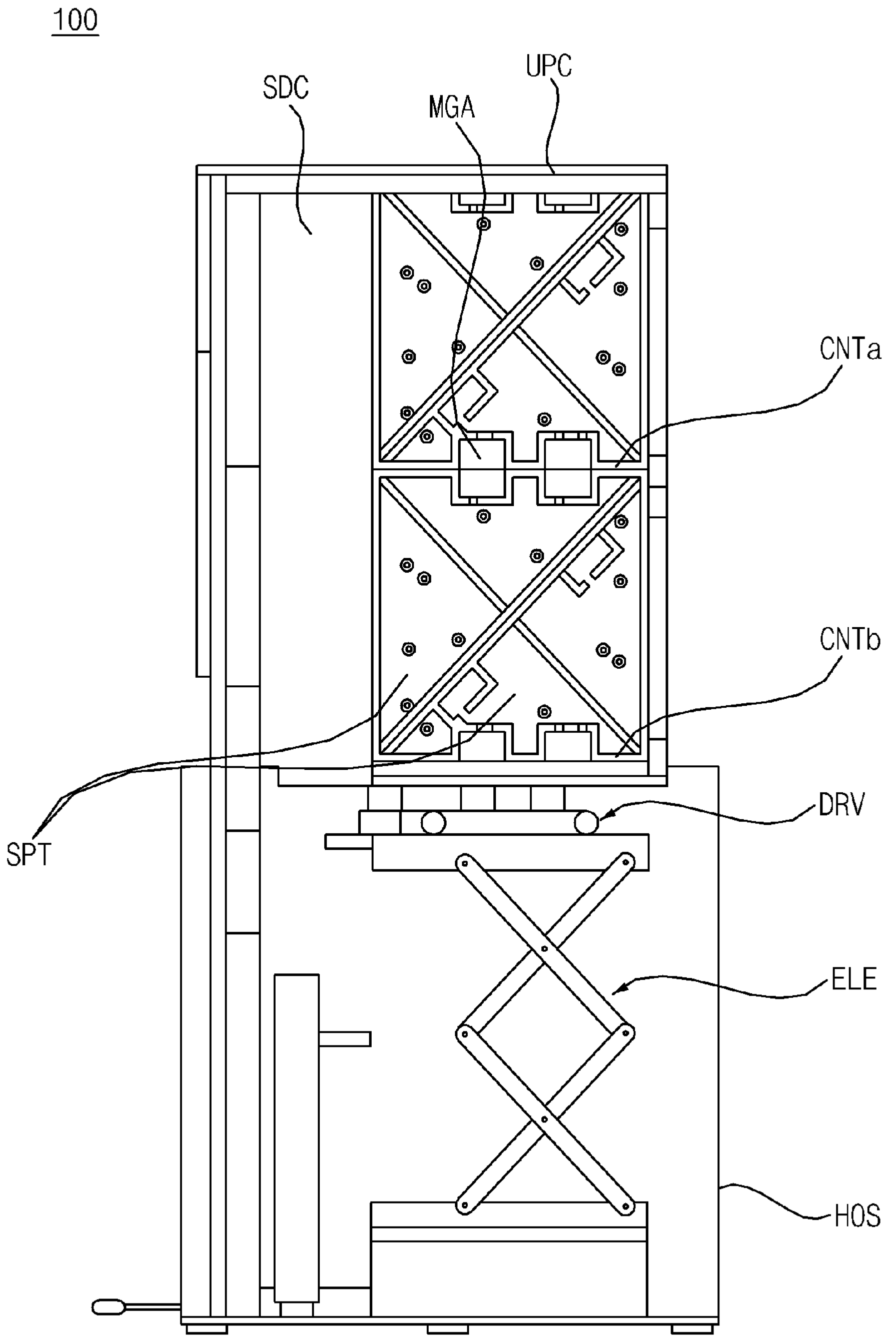
FIG. 11B to FIG. 12F are views referred to for describing FIG. 11A.

Referring to FIG. 11B, a supporter SPT for supporting a display element may be disposed on a rear face of the display element.

Further, an electromagnet MGA may be disposed on the rear face of the display element.

For example, the electromagnet MGA may be disposed in a line on the rear face of the display element, or a plurality of electromagnets MGA may be disposed, spaced apart from each other.

Meanwhile, in the second mode, the distance between the unfolded display elements may be fixed based on a signal applied to the electromagnet MGA. Accordingly, it is possible to implement a display device that can be folded or unfolded by using a plurality of display elements.

Figure 11C:
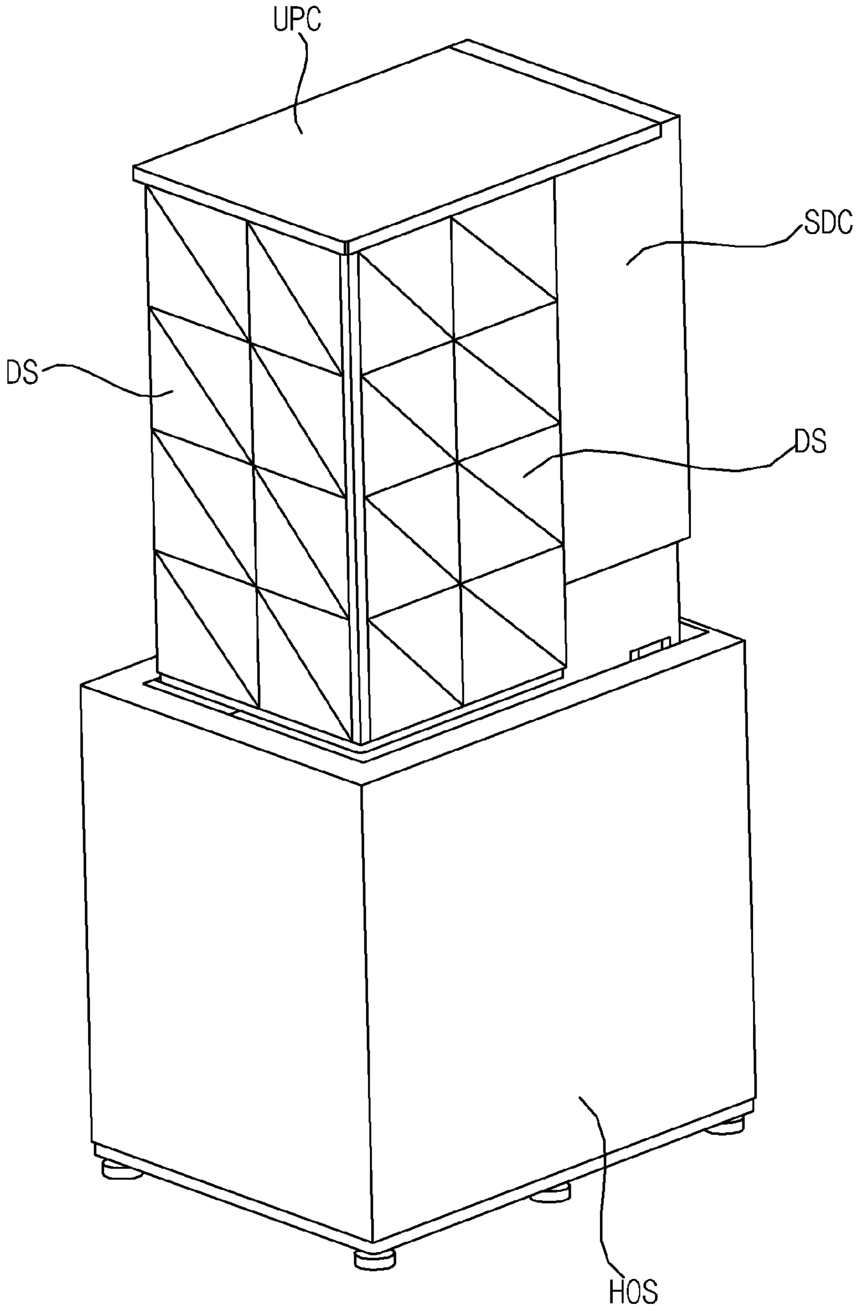

Referring to FIG. 11C, when the plurality of display elements DSa to DSn is unfolded in the second mode, the upper cover UPC may be connected to the side cover SDC as shown in FIG. 11C.

Figure 11D:
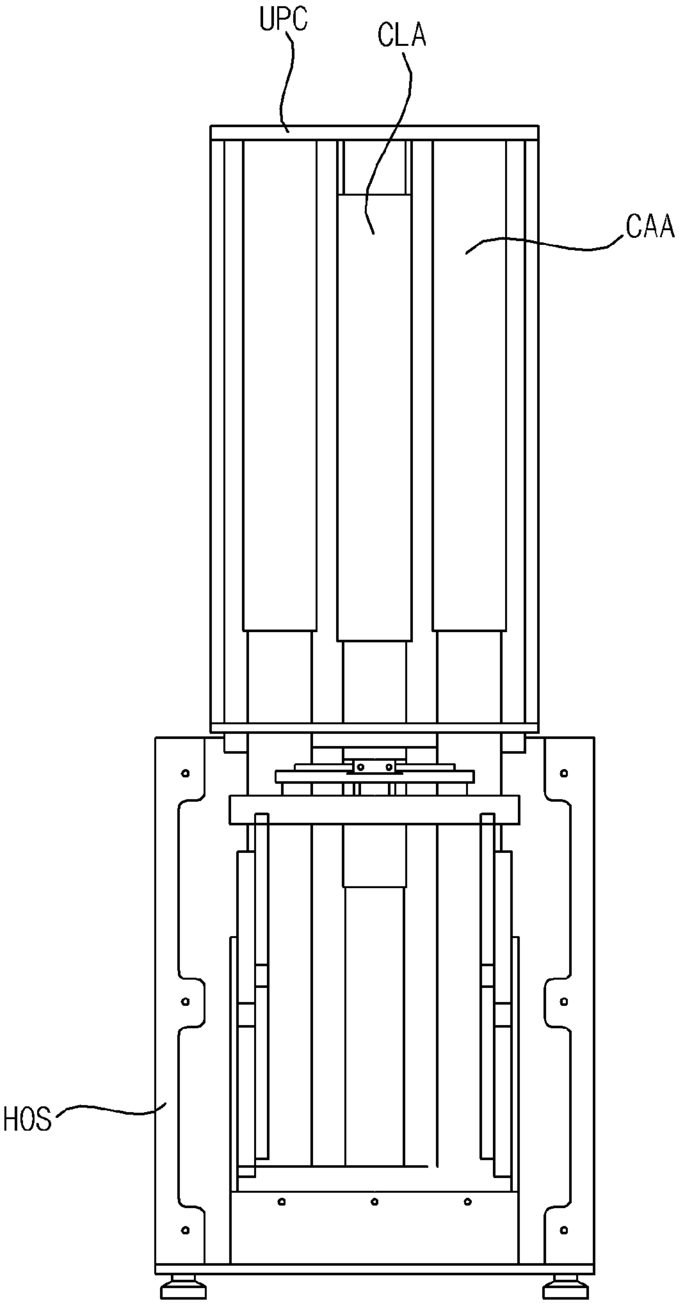

Meanwhile, FIG. 11D illustrates a lifting actuator CLA and a cover elevating actuator which are projected out of the housing HOS when the plurality of display elements DSa to DSn is unfolded in the second mode.

The lifting actuator CLA may cause the plurality of display elements to rise or fall.

On the other hand, the cover elevating actuator CAA may cause the side cover SDC to rise or fall. In addition, the cover elevating actuator CAA may cause the upper cover UPC to rise or fall.

Meanwhile, the display elements on each layer may be sequentially folded or unfolded by sequentially matching the actuation time of the lift LFT which moves the display elements along the Z axis and the actuation time of the motor STM which rotates the display elements or a plate where the display elements are placed.

Meanwhile, the lift LFT may cause the display elements on the uppermost side, among the plurality of display elements to rise or fall. The lift LFT may cause them to rise or fall along the z axis.

Meanwhile, the motor STM may rotate the display elements on the lowermost side, among the plurality of display elements. The motor STM may cause them to move in a circular motion on the x and y axes.

Meanwhile, the elevating apparatus ELE may cause all of the plurality of display elements to rise or fall. The elevating apparatus ELE may cause them to rise or fall along the z axis.

Figure 11E:
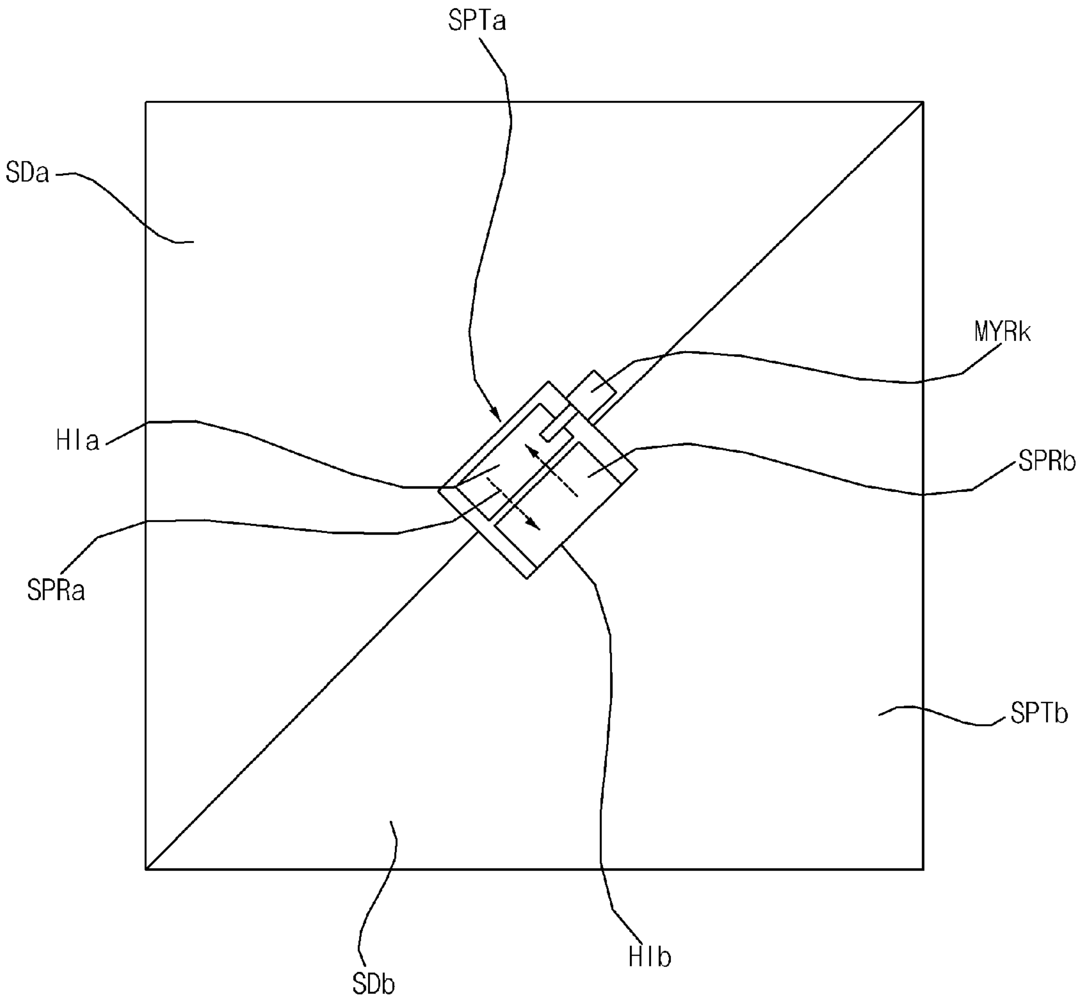

FIG. 11E is a view referred to for describing a structure of hinges HIa and HIb between first and second display elements SDa and SDb.

Referring to the drawing, supporters SPTa and SPTb are disposed on rear faces of the first and second display elements SDa and SDb, and the hinges HIa and HIb are disposed between the first and second display elements SDa and SDb.

Meanwhile, the hinges HIa and HIb preferably have elastic restoring force for a folding operation in the first mode or an unfolding operation in the second mode.

To this end, springs SPRa and SPRb are preferably inserted into the hinges HIa and HIb.

Meanwhile, the springs SPRa and SPRb may include two-stage torsion springs.

Meanwhile, the hinges HIa and HIb may be concise hinges.

Meanwhile, in the second mode, when at least a portion of the plurality of display elements is unfolded and raised to be lifted up, the electromagnet MGA applying a magnetic force is turned on. As the electromagnet MGA is turned on, the display elements remain unfolded.

Meanwhile, in the first mode, when at least a portion of the plurality of display elements is folded, the electromagnet MGA applying a magnetic force is turned off.

Meanwhile, in the second mode, when the lift LFT and the elevating apparatus ELE rise to a first height h1, a first number of display elements, among the plurality of display elements, is unfolded by a first rotation of the motor STM, forming a first polyhedral display, and, in the second mode, when the lift LFT and the elevating apparatus ELE rise to a second height h2 which is greater than the first height h1, a second number of display elements, among the plurality of display elements, is unfolded by a second rotation of the motor STM, forming a second polyhedral display.

Meanwhile, if the second height h2 is twice the height of the first height h1, the second rotation may be twice as much as the first rotation.

Meanwhile, in the second mode, the higher the lift LFT and the elevating apparatus go up, the larger the number of rotations of the motor. Accordingly, it is possible to implement a display device that can be folded or unfolded by using a plurality of display elements. This will be described with reference to FIGS. 12A to 12F.

FIGS. 12A to 12F are views referred to for describing how a plurality of display elements operate in the first mode and the second mode.

Figure 12A:
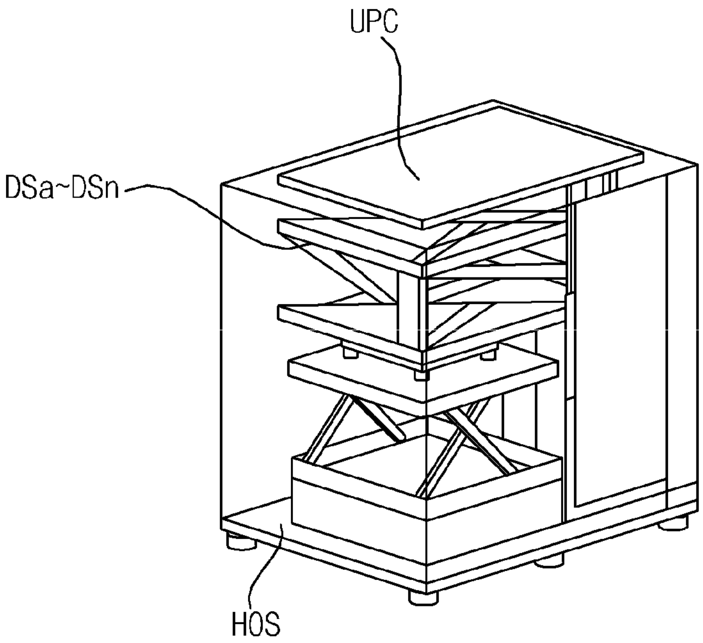

First, FIG. 12A illustrates that the plurality of display elements DSa to DSn is positioned in the housing HOS in the first mode. That is, as shown in FIG. 1A, the plurality of display elements DSa to DSn are folded against each other.

Figure 12B:
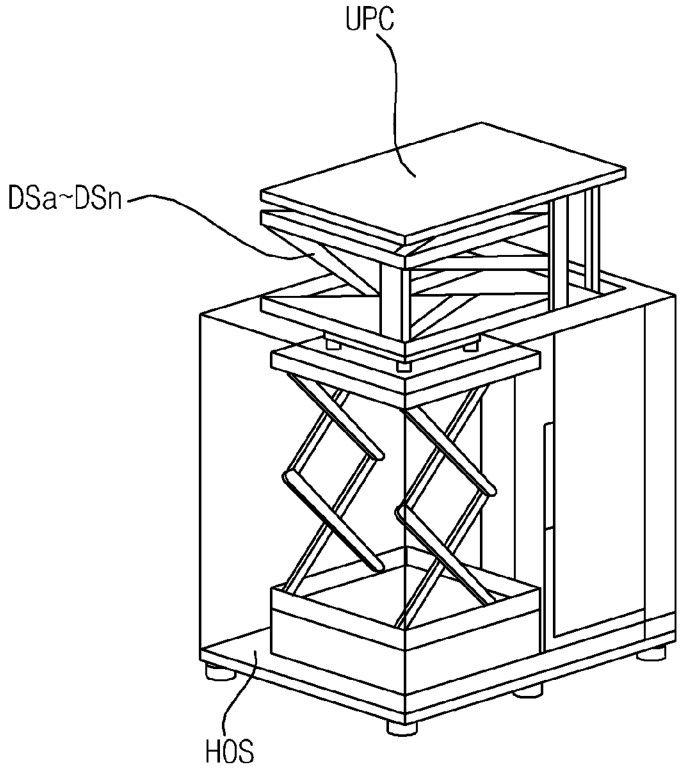

Next, FIG. 12B illustrates the plurality of display elements DSa to DSn being lifted.

For example, all of the plurality of display elements DSa to DSn may be raised by the elevating apparatus ELE.

Figure 12C:
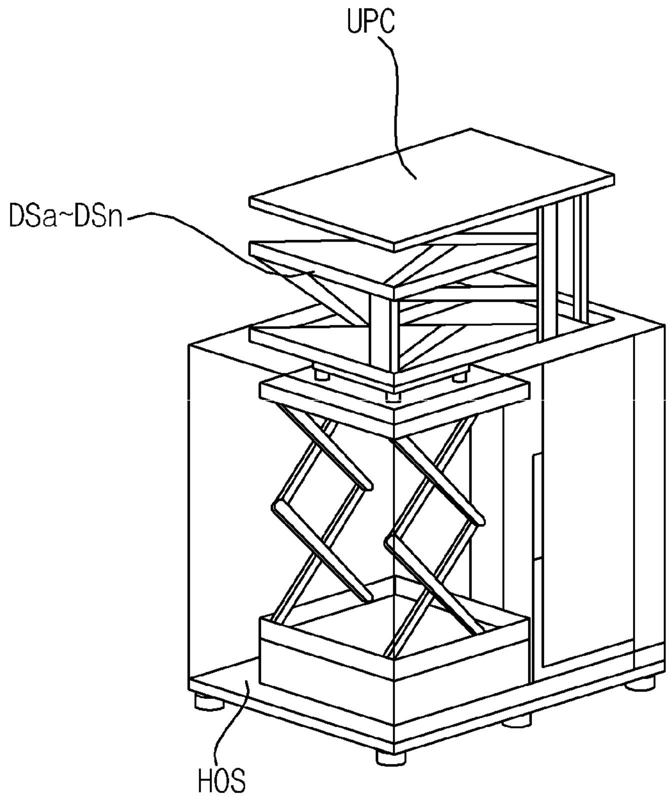

Next, FIG. 12C illustrates the plurality of display elements DSa to DSn being rotated.

For example, the motor STM may rotate the plurality of display elements DSa to DSn in a first rotational direction. Accordingly, a portion of the plurality of display elements DSa to DSn is unfolded.

Figure 12D:
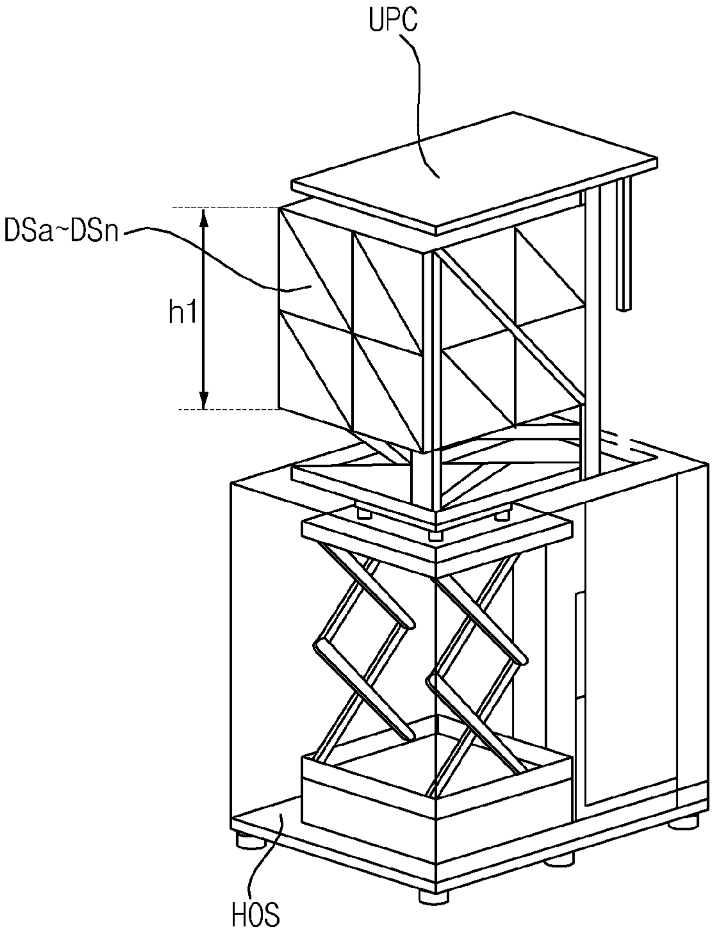

That is, as shown in FIG. 12D, a portion of the plurality of display elements DSa to DSn is unfolded, thereby implementing a two-stage or two-tiered display device 100 having a first height h1.

Figure 12E:
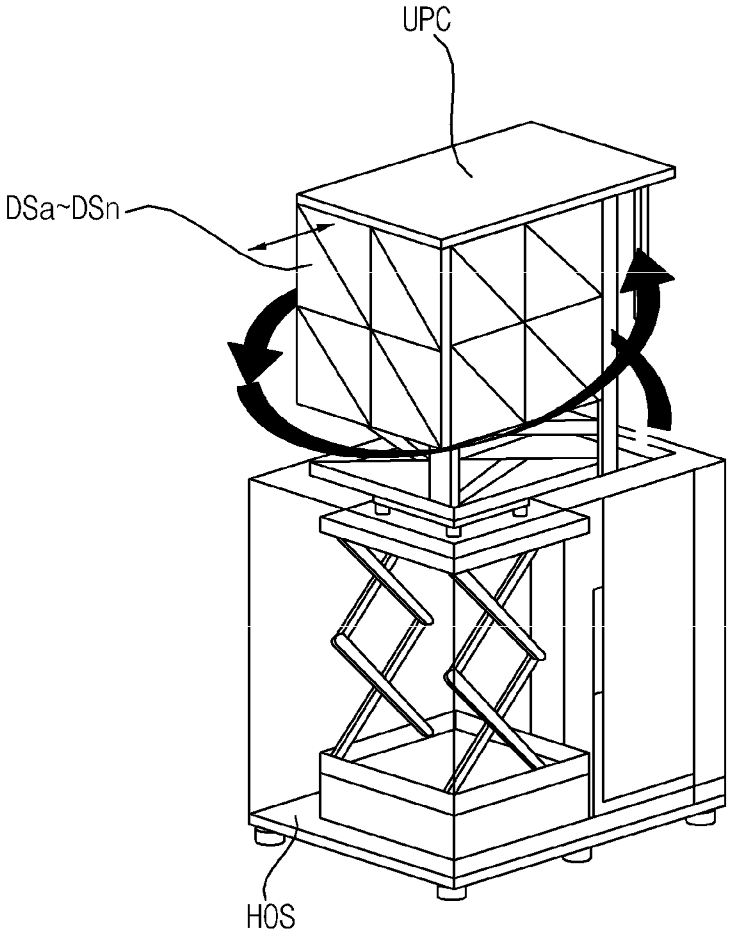

Next, as shown in FIG. 12E, an electrical signal is supplied to the electromagnet MGA in order to fix the distance between the unfolded display elements adjacent to each other.

Accordingly, it is possible to implement a display device which has larger volume and looks more similar to a polyhedron shape, in comparison to FIG. 12D.

Meanwhile, the process in FIG. 12D may be called a matching process, by which shape matching is achieved.

Figure 12F:
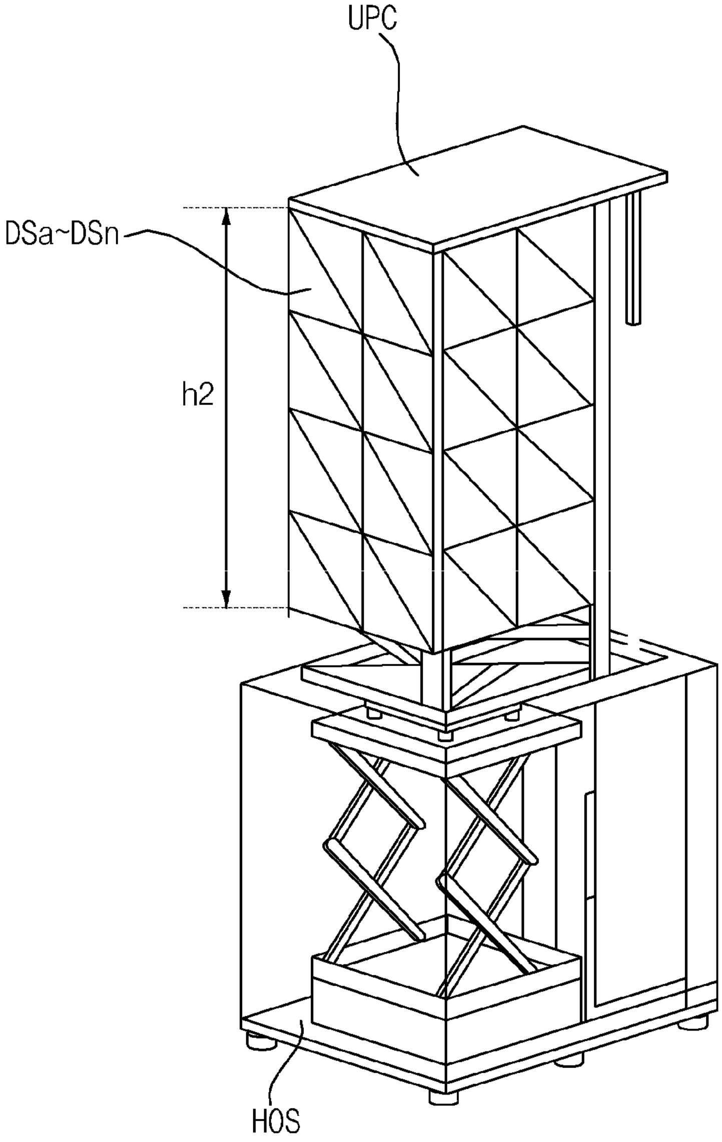

Next, FIG. 12F illustrates the plurality of display elements DSa to DSn being further rotated.

For example, the motor STM may rotate the plurality of display elements DSa to DSn further in the first rotational direction. Accordingly, another portion or all of the plurality of display elements DSa to DSn is unfolded.

That is, as shown in FIG. 12F, another portion or all of the plurality of display elements DSa to DSn is unfolded, thereby implementing a four-stage or four-tier display device having a second height h2 which is greater than the first height h1.

Meanwhile, the second height h2 in FIG. 12F may be twice the first height h1 in FIG. 12D. Accordingly, the total number of rotations in FIG. 12F may be twice the total number of rotations in FIG. 12D.

For example, once rotation is performed once in the first rotational direction in FIG. 12D, rotation may be performed once more in the first rotational direction in FIG. 12F. As a result, the total number of rotations in FIG. 12F may be 2, and the total number of rotations in FIG. 12D may be 1.

Therefore, the height of multiple stages of the display device may be adjusted in proportion to the number of rotations. Consequently, it is possible to implement a 3-dimensional display device that can be varied in height.

Meanwhile, in the second mode, the angle between first and second display elements DSa and DSb adjacent to each other, among the plurality of display elements DSa to DSn, may be kept at 180 degrees.

Meanwhile, in the second mode, the angle between third and fourth display elements adjacent to each other and forming different faces at the same height, among the plurality of display elements DSa to DSn, may be kept at 90 degrees.

Meanwhile, in the second mode, fifth and sixth display elements adjacent to each other and positioned on different tiers, among the plurality of display elements, may differ in height. Accordingly, it is possible to implement a display device that can be folded or unfolded by using a plurality of display elements.

Meanwhile, the first plate FLTa of FIG. 11A is connected to another portion of the plurality of display elements DSa to DSn, that is, the display elements on the lower side, and the motor STM rotates the first plate FLTa.

In order to supply a torque for rotating the first plate FLTa, a driving pulley rotated by the motor STM, a driven pulley (not shown) to which the first plate FLTa is connected, and a belt (not shown) wound on the driving pulley (not shown) and the driven pulley (not shown) may be used.

Furthermore, the display device 100 may further include a driving gear (not shown) connected to the motor STM and rotated by the motor STM, and a driving gear (not shown) to which the first plate FLTa is connected.

Meanwhile, the display device 100 according to another embodiment of the present disclosure may include a housing HOS, a plurality of display elements DSa to DSn disposed in the housing HOS in a first mode and configured to project out of the housing HOS in a second mode, a side cover SDC connected to a portion of the plurality of display elements DSa to DSn, a lift LFT disposed in the housing HOS, for lifting the side cover SDC in a first axial direction, a first plate FLTa disposed in the housing HOS and connected to another portion of the plurality of display elements DSa to DSn, a motor STM disposed in the housing HOS, for rotating the first plate FLTa, a second plate FLTb disposed in the housing HOS and placed under the motor STM, and an elevating apparatus ELE disposed under the second plate FLTb in the housing HOS, for elevating the second plate FLTb in the first axial direction. The plurality of display elements DSa to DSn is folded in the first axial direction in the first mode, and at least a portion of the plurality of display elements DSa to DSn is unfolded in the second mode, thereby forming a polyhedral display. Accordingly, it is possible to implement a display device that can be folded or unfolded by using a plurality of display elements. In particular, it is possible to implement a cuboid-shaped display device 100 by using a plurality of display elements DSa to DSn.

While the disclosure has been particularly shown and described with reference to exemplary embodiments, it will be understood by those of ordinary skill in the art that various changes in form and details may be made therein without departing from the spirit and scope of the disclosure as defined by the following claims. Such modifications should not be individually understood from the technical spirit or prospect of the present disclosure.

What is claimed is:

1. A display device comprising:
- a housing;
- a plurality of display elements disposed in the housing in a first mode and configured to project out of the housing in a second mode; and
- a driving device configured to fold the plurality of display elements in a first axial direction in the first mode, and unfold at least a portion of the plurality of display elements in the second mode to form a polyhedral display,
- wherein the display elements include triangular origami display elements.

2. The display device of claim 1, wherein, in the second mode, in response to the plurality of display elements rising to a first height, a first number of display elements, among the plurality of display elements, is unfolded to form a first polyhedral display, and, in the second mode, in response to the plurality of display elements rising to a second height which is greater than the first height, a second number of display elements, among the plurality of display elements, is unfolded to form a second polyhedral display.

3. The display device of claim 1, wherein the driving device includes:
- a lift disposed in the housing, and configured to lift in the first axial direction;
- a motor disposed in the housing, and configured to rotate a plate connected to a portion of the plurality of display elements; and
- an elevating apparatus configured to elevate the plate in the first axial direction.

4. The display device of claim 1, wherein the driving device includes:
- a motor disposed in the housing, and configured to rotate a plate connected to a portion of the plurality of display elements; and
- wires connected to another portion of the plurality of display elements to be elevated in the first axial direction.

5. The display device of claim 1, wherein the driving device includes:
- at least one tube disposed between the plurality of display elements; and
- a compressor disposed in the housing, and configured to supply air to the tube.

6. The display device of claim 1, further comprising:
- a side cover connected to a portion of the plurality of display elements;
- a lift disposed in the housing, and configured to lift the side cover in the first axial direction;
- a first plate disposed in the housing and connected to another portion of the plurality of display elements;
- a motor disposed in the housing, and configured to rotate the first plate;
- a second plate disposed in the housing and placed under the motor; and
- an elevating apparatus disposed under the second plate in the housing, and configured to elevate the second plate in the first axial direction.

7. The display device of claim 6, wherein, in the second mode, in response to the lift and the elevating apparatus rising to a first height, a first number of display elements, among the plurality of display elements, is unfolded by a first rotation of the motor, and is configured to form a first polyhedral display, and, in the second mode, in response to the lift and the elevating apparatus rising to a second height which is greater than the first height, a second number of display elements, among the plurality of display elements, is unfolded by a second rotation of the motor, and is configured to form a second polyhedral display.

8. The display device of claim 6, wherein, in the second mode, as a height of the lift and the elevating apparatus increases, the number of rotations of the motor increases.

9. The display device of claim 6, further comprising an upper cover connected to a portion of the plurality of display elements, wherein the upper cover is connected to the side cover.

10. The display device of claim 9, wherein, as the lift and the elevating apparatus rise in the first axial direction and the motor rotates, the plurality of display elements rise, at least a portion of the plurality of display elements is unfolded, and the upper cover covers top faces of the plurality of display elements.

11. The display device of claim 6, wherein the first and second display elements adjacent to each other are connected by at least one hinge, the first and second display elements are folded against each other in the first mode, and the first and second display elements intersect at a right angle or are unfolded with respect to the hinge.

12. The display device of claim 11, wherein at least one flexible connector is disposed between the first and second display elements.

13. The display device of claim 1, wherein first to third display elements, among the plurality of display elements, which overlap each other in the first mode, are unfolded in a line in the second mode, a connecting member with elasticity is disposed between the first display element and the second display element, and a hinge is disposed between the second display element and the third display element.

14. The display device of claim 13, wherein a display surface is formed on front faces of the second display element and the third display element, which are opposite sides of the rear faces contacting the hinge.

15. The display device of claim 6, wherein as the lift and the elevating apparatus rise in the first axial direction, the plurality of display elements rises, and wherein as the motor rotates, the plurality of display elements rotates, and at least a portion of the plurality of display elements is unfolded, and wherein as an electrical signal is supplied to an electromagnet between the plurality of display elements, the distance between the unfolded display elements is fixed.

16. A display device comprising:

a housing;

a plurality of display elements disposed in the housing in a first mode and configured to project out of the housing in a second mode; and a driving device configured to fold the plurality of display elements in a first axial direction in the first mode, and unfold at least a portion of the plurality of display elements in the second mode to form a polyhedral display, wherein an electromagnet or a magnet is disposed on rear faces of the display elements.

17. A display device comprising:

a housing;

a plurality of display elements disposed in the housing in a first mode and configured to project out of the housing in a second mode;

a side cover connected to a portion of the plurality of display elements;

a lift disposed in the housing, and configured to lift the side cover in a first axial direction;

a first plate disposed in the housing and connected to another portion of the plurality of display elements;

a motor disposed in the housing, and configured to rotate the first plate;

a second plate disposed in the housing and placed under the motor; and an elevating apparatus disposed under the second plate in the housing, and configured to elevate the second plate in the first axial direction, wherein the plurality of display elements is folded in the first axial direction in the first mode, at least a portion of the plurality of display elements is unfolded in the second mode, and a polyhedral display is formed.

18. The display device of claim 17, wherein, in the second mode, at least a portion of the plurality of display elements is unfolded and raised based on a rotation of the motor, and is configured to form the polyhedral display.

19. The display device of claim 17, further comprising:

a hinge connected between the plurality of display elements; and an electromagnet disposed on rear faces of the display elements, wherein, in the second mode, the distance between the unfolded display elements is fixed based on a signal applied to the electromagnet.

* * * * *